United States Patent
Kim et al.

(10) Patent No.: US 8,531,617 B2
(45) Date of Patent: Sep. 10, 2013

(54) DISPLAY DEVICE AND METHOD OF MANUFACTURING THE SAME

(75) Inventors: Dong Hyuk Kim, Suwon-Si (KR); Neung Ho Cho, Suwon-Si (KR); Young Tae Noh, Seoul (KR); Jung Mok Park, Suwon-Si (KR); Hyun Su Lim, Suwon-Si (KR)

(73) Assignee: Samsung Display Co., Ltd. (KR)

( * ) Notice: Subject to any disclaimer, the term of this patent is extended or adjusted under 35 U.S.C. 154(b) by 1314 days.

(21) Appl. No.: 11/932,852

(22) Filed: Oct. 31, 2007

(65) Prior Publication Data

US 2008/0106661 A1 May 8, 2008

(30) Foreign Application Priority Data

Nov. 7, 2006 (KR) .................. 10-2006-0109417

(51) Int. Cl.
*G02F 1/1333* (2006.01)
*G02F 1/1345* (2006.01)

(52) U.S. Cl.
USPC ........................................... 349/40; 349/152

(58) Field of Classification Search
USPC .................................. 349/40, 152
See application file for complete search history.

(56) References Cited

U.S. PATENT DOCUMENTS

| | | | |
|---|---|---|---|
| 6,791,632 B2 | 9/2004 | Lee et al. | |
| 6,909,116 B2 | 6/2005 | Watanabe et al. | |
| 7,460,203 B2 * | 12/2008 | Kim | 349/149 |
| 2004/0027502 A1 * | 2/2004 | Tanaka et al. | 349/40 |
| 2005/0007507 A1 * | 1/2005 | Ono et al. | 349/38 |
| 2005/0225709 A1 * | 10/2005 | Komeno et al. | 349/149 |

FOREIGN PATENT DOCUMENTS

| | | |
|---|---|---|
| JP | 11326952 | 11/1999 |
| JP | 2001318392 | 11/2001 |
| JP | 2006038911 | 2/2006 |
| KR | 1020040055249 | 6/2004 |
| KR | 1020040110684 | 12/2004 |
| KR | 1020050002299 | 1/2005 |
| KR | 1020050069023 | 7/2005 |
| KR | 1020060083261 | 7/2006 |

* cited by examiner

*Primary Examiner* — Edward Glick
*Assistant Examiner* — Dennis Y Kim
(74) *Attorney, Agent, or Firm* — Cantor Colburn LLP

(57) ABSTRACT

A display includes; a substrate including a display region and a peripheral region, a common line portion provided in the peripheral region of the substrate, and the common line portion includes a common line and a common line protruding portion which extends away from and is wider than the common line, and a dummy pattern portion which partially overlaps a boundary region between the common line and the common line protruding portion.

20 Claims, 19 Drawing Sheets

DISPLAY DEVICE AND METHOD OF MANUFACTURING THE SAME

This application claims priority to Korean Patent Application No. 2006-0109417, filed on Nov. 7, 2006, and all the benefits accruing therefrom under 35 U.S.C. §119, the contents of which in its entirety are herein incorporated by reference.

BACKGROUND OF THE INVENTION

1. Field of the Invention

The present invention relates to a display device and a method of manufacturing the same, and more particularly, to a display device which is capable of efficiently dispersing static electricity permeating through a ground line of a thin film transistor substrate.

2. Description of the Related Art

A liquid crystal display device is one type of a flat panel display device and includes a liquid crystal display panel which displays an image according to an external control signal, a driving unit which drives the liquid crystal display panel, and a backlight which is provided below the liquid crystal display panel.

The liquid crystal display panel is defined by a display region and a peripheral region. A plurality of pixels which together may be used to display images are provided in the display region, and pads and lines which supply power to the pixels are provided in the peripheral region. The pixels, the pads, and the lines of the liquid crystal display panel are formed on a light transmitting insulating substrate. Accordingly, during a manufacturing process, static electricity which is intermittently generated cannot be dispersed on or through a lower side of the insulating substrate, and the liquid crystal display panel is vulnerable to static electricity. In particular, static electricity which is generated during the manufacturing process permeates into the liquid crystal display panel through a common line which is provided in the peripheral region of the liquid crystal display panel and damages an insulating film or thin film transistors which are formed in the pixels, thereby causing a defective display panel.

BRIEF SUMMARY OF THE INVENTION

Accordingly, it is an aspect of the present invention to provide a display device and a method of manufacturing the same which are capable of effectively dispersing or removing external static electricity permeating into a common line.

According to a first exemplary embodiment of the invention, a display device includes a substrate including a display region and a peripheral region, a common line portion which is provided in the peripheral region of the substrate, and includes a common line and a common line protruding portion which extends away from and is wider than the common line, and a dummy pattern portion which partially overlaps a boundary region between the common line and the common line protruding portion.

The first exemplary embodiment of a display device according to the present invention further includes a common pad portion which is electrically connected to the common line protruding portion, wherein the common pad portion extends from the common line protruding portion.

In one exemplary embodiment the common pad portions are provided at both edges of one side of the substrate, and the dummy pattern portion is provided in a region between the common pad portions.

In one exemplary embodiment the dummy pattern portion includes; a dummy overlapping line which overlaps a boundary region between the common line and the common line protruding portion, at least one dummy electrode plates, wherein said at least one dummy electrode plate is connected to the dummy overlapping line, and dummy connecting lines which connect the dummy electrode plates.

In one exemplary embodiment the display device according to the present invention further includes an upper dummy electrode plate which is provided on at least one of the dummy electrode plates.

In one exemplary embodiment the display device according to the present invention further includes a dummy discharge plate which is spaced apart from the upper dummy electrode plate and is disposed on substantially the same plane as the upper dummy electrode plate, and a dummy active layer disposed in a region below the upper dummy electrode plate and the dummy discharge plate.

In another exemplary embodiment of the present invention the display device further includes gate lines, data lines, thin film transistors, pixel capacitors, and storage capacitors provided in the display region of the substrate, wherein the common line portion is disposed on substantially the same layer as the data lines, and the dummy pattern portion is disposed on substantially the same layer as the gate lines.

In another exemplary embodiment of present invention the thin film transistor includes an active layer, and a buffer layer, which has a smaller height than the active layer and is disposed on substantially the same layer as the active layer in an overlapping region between the common line portion and the dummy pattern portion.

In another exemplary embodiment of the present invention one terminal of each of the storage capacitors is disposed on substantially the same layer as the gate lines, and said one terminal of each of the storage capacitors is connected to the common line of the common line portion through a connecting pad.

According to a second exemplary embodiment of the present invention, a display device includes; a substrate including a display region and a peripheral region; a common line portion which is provided in the peripheral region of the substrate; dummy overlapping lines which overlap the common line portion; a plurality of dummy electrode plates having at least one dummy electrode plate which is connected to the dummy overlapping line; and dummy connecting lines which connect the dummy electrode plates.

In one exemplary embodiment the display device further includes an upper dummy electrode plate which is provided on at least one of the dummy electrode plates.

In one exemplary embodiment the display device further includes a dummy discharge plate which is spaced apart from the upper dummy electrode plate and disposed on substantially the same plane as the upper dummy electrode plate, and a dummy active layer which is provided in a region below the upper dummy electrode plate and the dummy discharge plate.

In one exemplary embodiment the upper dummy electrode plate further includes an electrode plate protruding portion which is separated from the dummy discharge plate.

In one exemplary embodiment thin film transistors each including an active layer are provided in the display region of the substrate. A buffer layer is disposed on substantially the same layer as the active layer and the buffer layer has a smaller height than the active layer, and is provided in a region between the common line portion and the dummy pattern portion.

In one exemplary embodiment the common line portion includes a common line, and a common line protruding portion which extends away from and has a larger width than the common line. The dummy overlapping line overlaps the common line portion in a boundary region between the common line and the common line protruding portion.

According to a third exemplary embodiment of the present invention, a display device includes; a substrate comprising a display region and a peripheral region, wherein the display region has an active layer disposed on the display region, a common line portion which is provided in the peripheral region of the substrate, a dummy pattern portion which overlaps the common line portion, and a buffer layer which is provided in an overlapping region between the common line portion and the dummy pattern portion, wherein the buffer layer is formed on substantially the same layer as the active layer and has a smaller height than the active layer.

In one exemplary embodiment the common line portion includes a common line, and a common line protruding portion which extends away from and has a larger width than the common line. The dummy pattern portion includes; a dummy overlapping line which overlaps a boundary region between the common line and the common line protruding portion, at least one dummy electrode plates, wherein at least one of the dummy electrode plates is connected to the dummy overlapping line, and dummy connecting lines which connect the dummy electrode plates.

In one exemplary embodiment the display device further includes an upper dummy electrode plate which is provided on at least one of the dummy electrode plates, a dummy discharge plate which is spaced apart from the upper dummy electrode plate and is disposed on substantially the same plane as the upper dummy electrode, and a dummy active layer which is provided in a region below the upper dummy electrode plate and the dummy discharge plate.

According to a fourth exemplary embodiment of the present invention, a method of manufacturing a display device includes: forming gate electrodes and gate lines in a display region of a substrate and forming a dummy pattern portion in a peripheral region of the substrate; forming a gate insulating film on the substrate having the gate electrode, the gate lines and the dummy pattern portion; forming an active layer on the gate insulating film; forming a buffer layer having substantially the same thickness as the active layer on at least a portion of the dummy pattern portion; and forming data lines, source electrodes, and drain electrodes in the display region, and forming a common line portion supplied with common power in the peripheral region, such that a portion of the common line portion is disposed on the buffer layer.

In one exemplary embodiment forming the buffer layer includes: forming a thin film for the buffer layer on the gate insulating film; coating a photosensitive film on the thin film; forming a photosensitive film mask pattern by a photolithography process using a mask including a slit and a partially transparent portion, wherein the thickness of the photosensitive film on a region of the active layer thin film where the buffer layer is to be formed is smaller than a thickness of the photosensitive film on a region of the thin film where the active layer is to be formed; etching the thin film using the photosensitive film mask pattern to form the active layer in the display region and to form the buffer layer in the peripheral region; removing a portion of the photosensitive film mask pattern to expose the buffer layer; removing a portion of an upper region of the buffer layer to reduce the thickness of the buffer layer; and removing the residual photosensitive film.

BRIEF DESCRIPTION OF THE DRAWINGS

The above and other features and advantages of the invention will become more apparent by describing in detail preferred exemplary embodiments thereof with reference to the attached drawings in which.

DETAILED DESCRIPTION OF THE INVENTION

Figure 1:
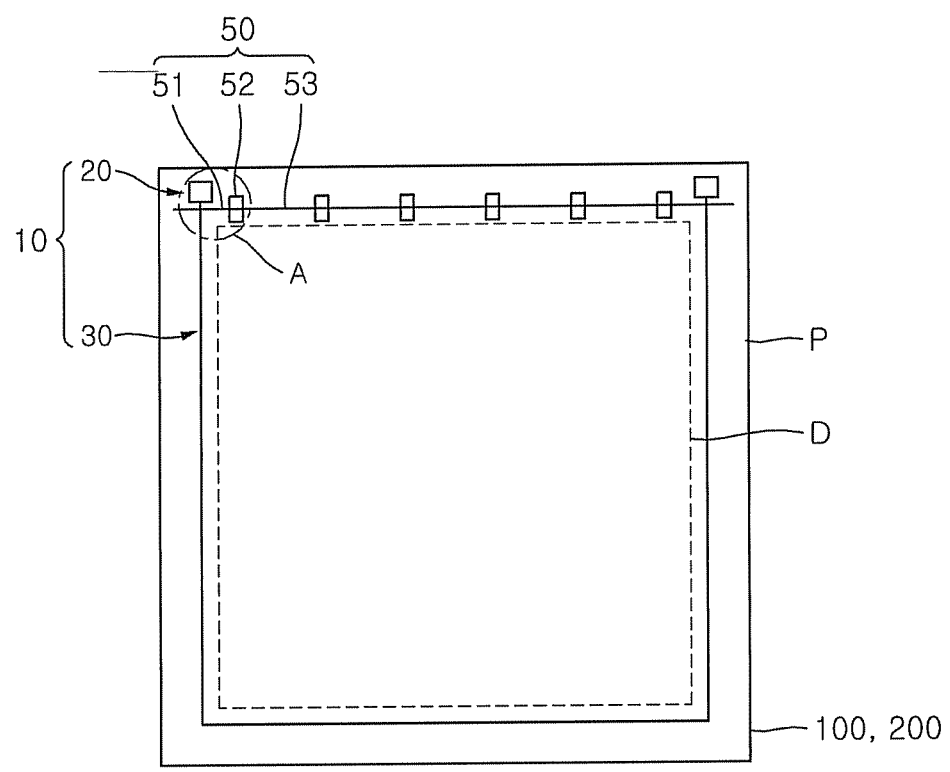
FIG. 1 is a top plan view of a first exemplary embodiment of a display device according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the invention will be described in detail with reference to the accompanying drawings.

Figure 2:
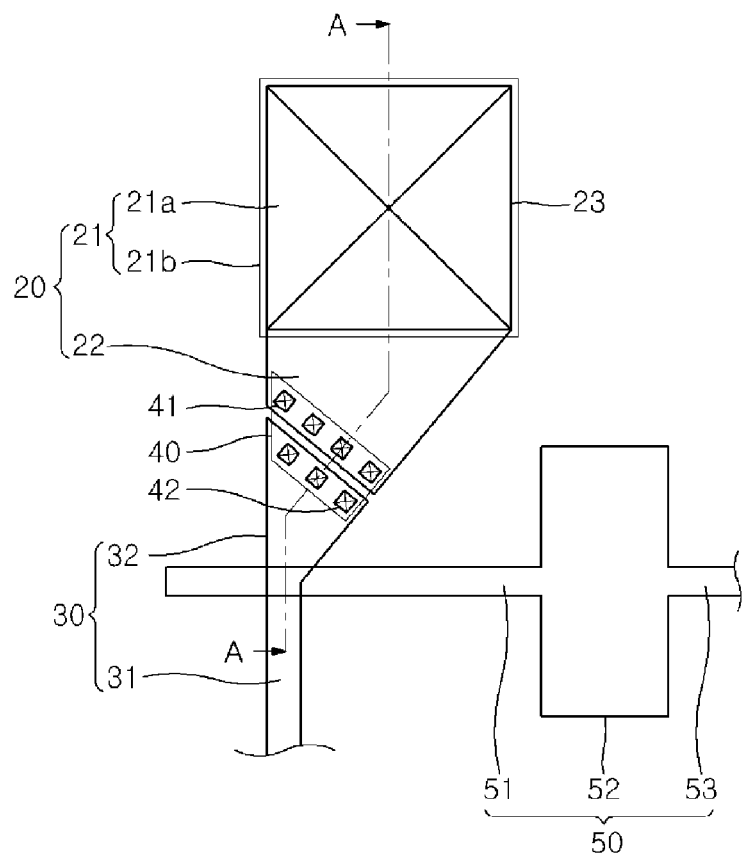
FIG. 2 is an enlarged top plan view of a region A of FIG. 1.
Figure 3:
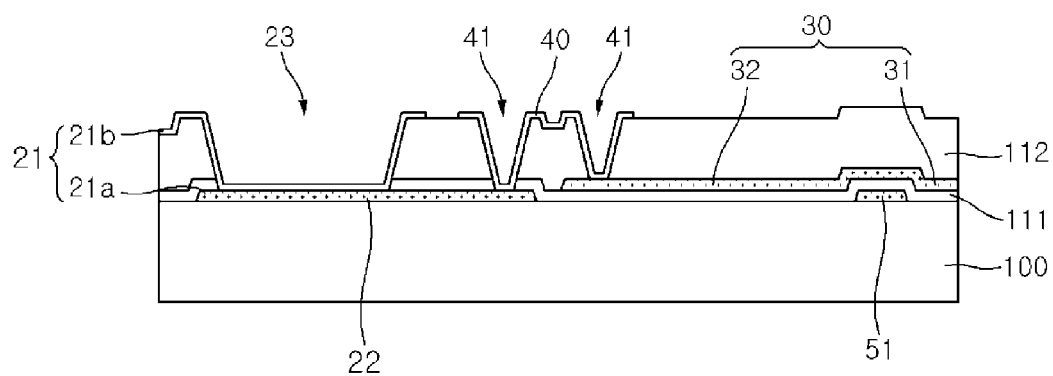
FIG. 3 is a cross-sectional view taken along line A-A of FIG. 2.
Figure 4:
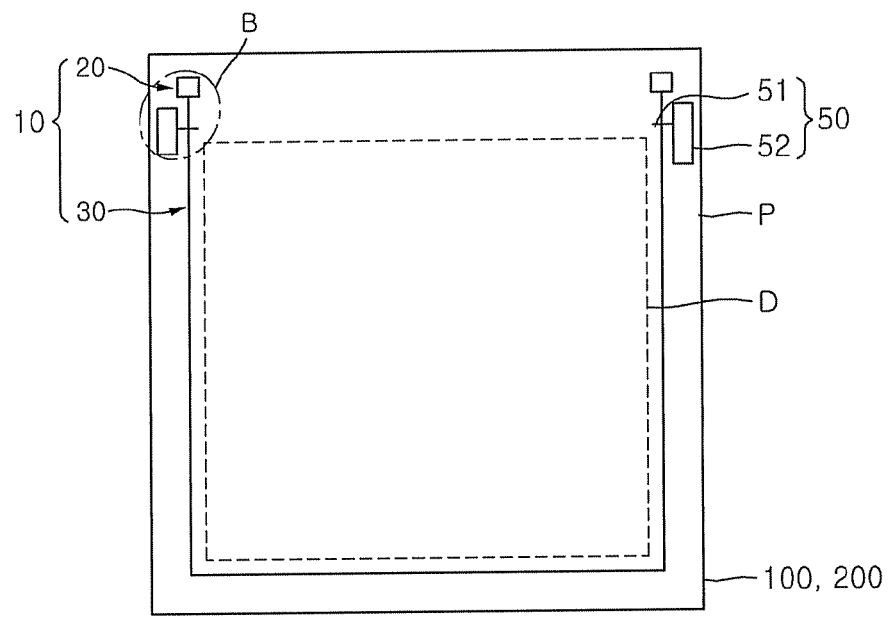
FIG. 4 is a top plan view of a modification of the first exemplary embodiment of a display device according to the present invention.
Figure 5:
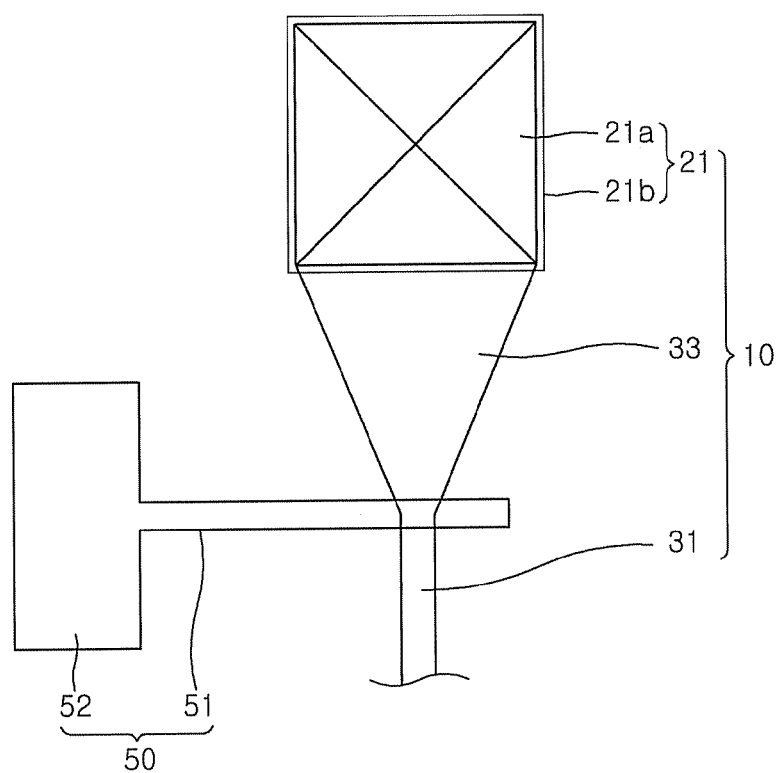
FIG. 5 is an enlarged top plan view of a region B of FIG. 4.

FIG. 1 is a top plan view illustrating a first exemplary embodiment of a display device according to the present invention. FIG. 2 is an enlarged top plan view of a region A of FIG. 1. FIG. 3 is a cross-sectional view taken along line A-A of FIG. 2. FIG. 4 is a top plan view of a modification of the first exemplary embodiment of a display device according to the present invention, and FIG. 5 is an enlarged top plan view illustrating a region B of FIG. 4.

Referring to FIGS. 1 to 3, a display device according to this exemplary embodiment includes a thin film transistor substrate 100 wherein a display region D and a peripheral region P are defined, a common electrode substrate 200, and a liquid crystal layer (not shown) which is interposed between the thin film transistor substrate 100 and the common electrode substrate 200.

Although not shown, a plurality of gate lines, a plurality of data lines, and a plurality of thin film transistors which are connected to the gate lines and the data lines are provided in a display region D of the thin film transistor substrate 100. Pixel electrodes (not shown) which are connected to the thin film transistors and storage electrode lines which partially overlap the pixel electrodes are provided in the display region D of the thin film transistor substrate 100. Although not shown, a plurality of gate line pads which are connected to the plurality of respective gate lines, and a plurality of data line pads which are connected to the plurality of respective data lines are provided in a peripheral region P of the thin film transistor "TFT" substrate 100. A common power supply unit 10 which is connected to the storage electrode line and a dummy pattern portion 50 which partially overlaps the common power supply unit 10 and prevents static electricity are provided in the peripheral region P of the thin film transistor substrate 100.

Although not shown, a color filter, and a common electrode are provided in a display region D of the common electrode substrate 200. Although not shown, a terminal unit which is connected to the common power supply unit 10 of the thin film transistor substrate 200 and applies common power to the common electrode is provided in the peripheral region P of the common electrode substrate 200. The plurality of pixels, each having a gate line, a data line, a thin film transistor, a liquid crystal capacitor, and a storage capacitor, are provided in the display region D.

As shown in FIGS. 1 and 2, the common power supply unit 10 to which the common power is applied includes at least one common pad portion 20, a common line portion 30 which is provide along at least a portion of an edge of the display region D, and a connecting portion 40 which connects the common pad portion 20 and the common line portion 30.

The common pad portion 20 includes a common pad 21, and a common pad protruding part 22 which extends from the common pad 21.

According to the current exemplary embodiment the common pad 21 is formed in a substantially rectangular planar shape. According to one exemplary embodiment the common pad 21 include a first pad layer 21a and a second pad layer 21b, and the first pad layer 21a and the second pad layer 21b are electrically connected to each other through a contact hole 23. In one exemplary embodiment the first pad layer 21a is manufactured using at least one metal selected from a group consisting of Al, Nd, Ag, Ti, Ta, Mo, Cr, a molybdenum wolfram alloy ("MoW"), and Cu, and alloys thereof. In addition, in one exemplary embodiment the first pad layer 21a may be formed of a single layer, or may have a multilayered structure which is obtained by continuously laminating layers of the abovementioned metals. As for the first pad layer 21a, it may be made of a metal film which may also be used to form the gate line (or gate electrode) in the display region D. Furthermore, in one exemplary embodiment the second metal layer 21b may be made of indium tin oxide ("ITO") or indium zinc oxide ("IZO"). As for the second metal layer 21b, it may be made of a transmitting metal film which may also be used to form the pixel electrode in the display region D.

The first pad layer 21a of the common pad 21 extends in a direction substantially parallel to a direction of extension of the common line portion 30. This extension of the first pad layer 21a of the common pad 21 forms the common pad protruding portion 22. In one exemplary embodiment as the common pad protruding portion 22 extends from the common pad 21 its width is reduced. That is, the common pad protruding portion 22 is formed in a substantially flat trapezoidal type. In one exemplary embodiment when a width between the common pad protruding portion 22 and the common pad 21 (that is, width of the common pad) is 1, a width at an end of the common pad protruding portion 22 is in a range of about 0.3 to about 0.9. In other words, a width at an end of the common pad protruding portion 22 may be about 30% to about 90% of a width between the common pad protruding portion 22 and the common pad 21.

The common line portion 30 includes a common line 31, and a common line protruding portion 32 which extends to the common pad portion 20.

The common line 31 is prepared in an edge region of the display region D. Accordingly, a portion of the common line 31 may be bent in order to surround the display region D. In one exemplary embodiment the common line 31 may be formed of a single line, and in alternative exemplary embodiments it may be formed of a plurality of lines. According to the current exemplary embodiment the common line 31 is formed by using at least one metal selected from a group consisting of Al, Nd, Ag, Ti, Ta, Mo, Cr, MoW, and Cu, and alloys thereof. In addition, in one exemplary embodiment the common line 31 may be formed of a single layer, and in alternative exemplary embodiments it may be formed of a multilayered layer which is obtained by continuously laminating the metals. As for the common line 31, it may be formed using a metal film which is also used to form a data line (or source electrode and drain electrode) in the display region D. In such an exemplary embodiment, when a width of the common pad is 1, a width of the common line 31 is in a range of about 0.001 to about 0.5.

In addition, the common line protruding portion 32 extends from an end of the common line 31 toward the common pad portion 20. In one exemplary embodiment the common line protruding portion 32 has a width which increases as it extends away from the common line 31. That is, in one exemplary embodiment the width of the common line protruding portion 32 which comes into contact with the common line 31 is similar to that of the common line 31, and a width of the end (that is, a region adjacent to the common pad protruding portion 22) of the common line protruding portion 32 is similar to that of an end of the common pad protruding portion 22. In one exemplary embodiment the widths of the corresponding portions may be substantially the same or may increase or decrease in a range of ±20%, from each other.

In the current exemplary embodiment, the common pad portion 20 and the common line portion 30 are electrically insulated from each other. That is, as shown in FIG. 3, the common pad portion 20 and the common line portion 30 are electrically insulated from each other by a gate insulating layer 111, as shown in FIG. 3. The common pad portion 20 is provided on one side of the TFT substrate 100, and the gate insulating layer 111 is provided on the common pad portion 20. The common line portion 30 is provided on one side of the gate insulating layer 111, and a protective film 112 is provided on the common line portion 30. Alternative exemplary embodiments include configurations wherein the common pad portion 20 and the common line portion 30 may be provided at substantially the same distance from the TFT substrate 100. In such an alternative exemplary embodiment, the common pad portion 20 and the common line portion 30 are most effective when spaced apart from each other in a horizontal direction.

According to the current exemplary embodiment the common pad portion 20 and the common line portion 30 which are spaced apart from each other are electrically connected to each other by the connecting portion 40. In one exemplary embodiment the connecting portion 40 is formed using indium tin oxide ("ITO") or indium zinc oxide ("IZO"). In one exemplary embodiment the connecting portion 40 may be formed from substantially the same light transmitting metal film as a pixel electrode of the display region D. The connecting portion 40 is electrically connected to the common pad portion 20 and the common line portion 30 by a first connecting contact hole 41 and a second connecting contact hole 42, respectively. Therefore, the connecting portion 40 can connect the common pad portion 20 and the common line portion 30 which are electrically spaced apart and/or isolated from each other.

As described above, while the common pad portion 20 is spaced apart from the common line portion 30, they are connected to each other by the separate connecting portion 40. Since they are physically isolated from each other the strength of the static electricity conducted between them is thereby reduced or effectively eliminated. That is, static electricity (which is simply a term for a large amount of unwanted charge which is developed during the manufacturing process) permeates through the common pad portion 20 as follows. Some of the static electricity which permeates into the common pad portion 20 flows through the connecting portion 40 which is connected to the common pad portion 20. However, since the common pad portion 20 and the connecting portion 40 come into contact with each other only through the contact holes 41 and 42, it is difficult for the static electricity to smoothly flow, and the charge is required to move a substantially long distance. The static electricity which permeates into the common pad portion 20 destroys an insulating layer such as the gate insulating film 111, located between the common pad portion 20 and the common line portion 30, and flows in the shortest distance. In other words, the static electricity will collapse, or short through, the gate insulating layer 111 to flow from the common pad portion 20 to the common line portion 30. As a result of short-circuiting through the insulating layer some of the energy of the static electricity is lost. The amount of energy expended by the static electricity may be predetermined by controlling different attributes of the insulating layer 111 and the spatial arrangement of the common pad portion 20 and the common line portion 30. Therefore, static electricity can be weakened to some degree.

However, the invention is not limited thereto. As in a modification of the current exemplary embodiment shown in FIGS. 4 and 5, when the common pad portion 20 and the common line portion 30 are connected to each other by at least one metal layer, the connecting portion 40 may be removed. As shown in FIG. 5, the common power supply unit 10 includes the common pad 21, the common line 31, and a common extending portion 33 which is provided between the common pad 21 and the common line 31. In one exemplary embodiment the common extending portion 33 has a planar shape in which a width of the common extending portion 33 is reduced as it extends toward the common line 31 from the common pad 21. This is because the common extending portion 33 is provided to have a connection with the common pad 21 having a large width approximately equal to the length of the common pad 21 itself and to have a connection with the common line 31 having a small width approximately equal to the length of the common line 31.

In addition, in the current exemplary embodiment, the two common pad portions are provided at both edges of the substrate 100, respectively, as shown in FIG. 1. The two common pad portions 20 are connected to each other by the common line portion 30. That is, the common pad portions 20 are provided at both edges of one side of the substrate 100, respectively, and the common line portion 30 which is connected to the common pad portions 20 is disposed along the circumference of the substrate 100, except for the one side of the substrate 100. The common line portion 30 has a substantially "U"-shaped pattern.

In the current exemplary embodiment common power is supplied to the common electrode substrate 200 through the common pad portions 20. To do so, one side of the common line portion 30 may be disconnected, and a common power generating unit (not shown) which generates and outputs common power may be provided between the disconnected regions. However, the present invention is not limited thereto. That is, in an alternative exemplary embodiment a separate input pad (not shown) may be provided on one side of the common line portion 30, and the input pad may be connected to a circuit board (not shown) by a flexible printed circuit board (not shown) and may be supplied with common power of the circuit board. In one exemplary embodiment the common power may simply be a common voltage.

Meanwhile, in the current exemplary embodiment, a dummy pattern portion 50 is provided which partially overlaps the common power supply unit 10 so as to prevent the build-up of static electricity.

As shown in FIGS. 1 and 2, the dummy pattern portion 50 which prevents the build up of static electricity includes a dummy overlapping line 51 which partially overlaps the common power supply unit 10, a plurality of dummy electrode plates 52 having at least one dummy electrode plate which is connected to the dummy overlapping line 51, and a dummy connecting line 53 which connects the dummy electrode plates 52. In the current exemplary embodiment the dummy pattern portion 50 is formed by using at least one metal selected from the group consisting of Al, Nd, Ag, Ti, Ta, Mo, Cr, "MoW", and Cu or an alloy thereof. In addition, in one exemplary embodiment the dummy pattern portion 50 may be formed of a single layer, and in an alternative exemplary embodiment the dummy pattern portion 50 may be formed with a multilayered structure which is obtained by sequentially laminating the above-mentioned metals. The dummy pattern portion 50 may be formed using the same metal film used for forming a gate line (or gate electrode) of the display region D. In the exemplary embodiment as shown in FIG. 2, the dummy overlapping line 51 and the dummy line 53 are manufactured in a single line. However, the invention is not limited thereto, and they may be formed in a plurality of lines.

In one exemplary embodiment, the dummy overlapping line 51 includes a portion which overlaps a boundary region between the common line protruding portion 32 of the common line portion 30 in the common power supply unit 10 and the common line 31. This is because the boundary region between the common line protruding portion 32 and the common line 31 has the largest resistance value, and the resistance value varies largely within this boundary region. That is, the width of the common line protruding portion 32 is gradually reduced, and is smallest at a region which comes into contact with the common line 31. In addition, the common line 31 extends with a predetermined width at the region which comes into contact with the common line protruding portion 32. Therefore, the resistance value increases toward the boundary region between the common line protruding portion 32 and the common line 31 from the end of the common line protruding portion 32, and as a result, is largest at the boundary region between the common line protruding portion 32 and the common line 31. This is because a resistance value of the line is in inverse proportion to an area of the line, in other words, the wider the line, the smaller its resistance value.

Due to the increase in the resistance value at the common line 31, an insulating property between the conductive films (that is, metal films) may be easily collapsed, or shorted through, in the boundary region between the common line protruding portion 32 and the common line 31, as compared with the other regions of the protruding portion 32 or the common line 31. By using these characteristics, the common line portion 30 of the common power supply unit 10 and the dummy overlapping line 50 may be electrically connected to each other so as to disperse static electricity.

That is, the static electricity which permeates through the common power supply unit 10 is guided to the common line portion 30 through the common pad portion 20. In the exemplary embodiment shown in FIGS. 1-3, the static electricity which is guided to the common line portion 30 is concentrated at the boundary region between the common line protruding portion 32 and the common line 31, the static electricity then shorts through a lower insulating film between the boundary region and the dummy overlapping line 51 thereby destroying the lower insulating film. Thereafter, the common line portion 30 and the dummy overlapping line 51 are electrically connected to each other so as to form a separate path through which the static electricity can flow. The static electricity flows through this path into the peripheral region P, which prevents the elements in the display region D from being damaged due to the static electricity.

In addition, in the current exemplary embodiment, the plurality of dummy electrode plates 52 are provided so as to disperse static electricity. In addition, at least one of the plurality of dummy electrode plates 52 is connected to the dummy overlapping line 51. As shown in FIG. 1, the plurality of dummy electrode plates 52 are provided between the two common pad portions 20 of the common power supply unit 10. The dummy electrode plates 52 which are provided in the edge regions of both sides are connected to the dummy overlapping line 51, and the other electrode plates 52 are electrically connected to neighboring electrode plates 52 through the dummy connecting lines 53. In the current exemplary embodiment, six dummy electrode plates 52 are shown. However, the invention is not limited thereto, and alternative exemplary embodiments include configurations wherein the number of dummy electrode plates 52 may be larger than or smaller than six.

As shown in FIGS. 4 and 5, the current exemplary embodiment of a display device may further include the dummy overlapping lines 51 which extend so as to overlap the boundary region between the common extending portion 33 and the common line 31, and the dummy electrode plates 52 which are connected to the dummy overlapping lines 51, respectively. That is, the current exemplary embodiment may be formed without the dummy connecting lines 53, and a large number of dummy electrode plates 52 may also be omitted. The dummy electrode plate 52 of the current exemplary embodiment shown in FIGS. 4 and 5 may be relatively large when compared to the dummy electrode plate 52 of the arrangement shown in FIGS. 1-3.

In the above described exemplary embodiment, the dummy pattern portion 50 overlaps the common power supply unit 10 which is supplied with the common power, but the invention is not limited thereto. The dummy pattern portion may overlap various lines which are provided in the peripheral circuit region.

In another exemplary embodiment a gate insulating film of the display region and a buffer layer made of a thin film, such as that used to form an active layer, may be additionally formed in the overlapping region between the common line portion of the common power supply unit and the dummy pattern portion. In addition, in such an exemplary embodiment a thin film pattern for an active layer is patterned using a slit mask, such that the thickness of the buffer layer becomes smaller than that of the active layer in the display region.

Hereinafter, a second exemplary embodiment of a display device according to the present invention will be described. A description of the elements which are common between the first exemplary embodiment and the second exemplary embodiment will be omitted. Aspects of the second exemplary embodiment to be described below may also be applied to the first exemplary embodiment. In the below description, an exemplary embodiment of a thin film transistor of the display device and an exemplary embodiment of a method of manufacturing the exemplary embodiment of a thin film transistor are mainly described.

Figure 6:
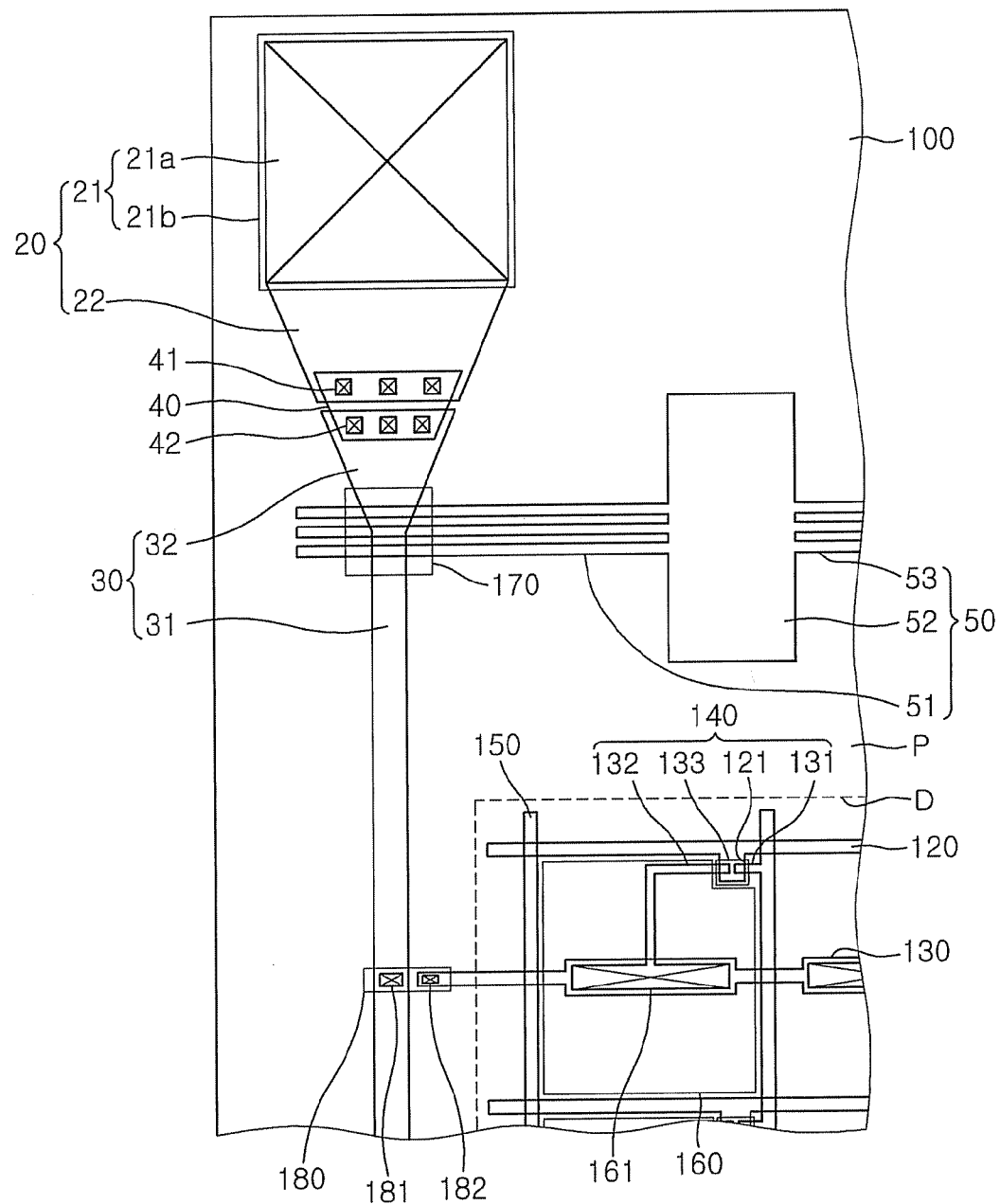
FIG. 6 is a top plan view illustrating a region of the second exemplary embodiment of a display device according to the present invention.

FIG. 6 is a top plan view illustrating a region of the second exemplary embodiment of a display device according to the present invention.

Referring to FIG. 6, a display region D of the second exemplary embodiment of a display device includes a plurality of gate lines 120 which extend in a substantially horizontal direction, a plurality of data lines 150 which extend in a substantially vertical direction, a plurality of thin film transistors ("TFTs") 140 which are provided at intersections of the gate lines 120 and the data lines 150, respectively, a plurality of storage electrode lines 130 which extend in the same direction as the gate lines 120, and pixel electrodes 160 including portions which overlap the storage electrode lines 130 and which are connected to the respective thin film transistors 140. Alternative exemplary embodiments include configurations wherein the plurality of TFTs 140 include a switching transistor and a driving transistor within the same pixel.

In the current exemplary embodiment the thin film transistor 140 includes a gate electrode 121 which is connected to the gate line 120, a source electrode 131 which is connected to the data line 150, and a drain electrode 132 which is connected to the pixel electrode 160. A gate insulating film 111 and an active layer 133 are provided between the source and drain electrodes 131 and 132, and the gate electrode 131. In the current exemplary embodiment, the active layer 133 includes an active film and an ohmic contact film. In such an exemplary embodiment the gate insulating film 111 may include an insulating film which contains a silicon oxide film and/or a silicon nitride film. In one exemplary embodiment an amorphous silicon layer may be used as the active film, and an amorphous silicon layer where silicide or N-type impurities are doped with a high concentration may be used as the ohmic contact film.

Similar to the first exemplary embodiment, the peripheral region P of the display device includes a common power supply unit 10 which includes a common pad portion and a common line portion. The Common line portion 30 is supplied with common power and includes a common line 31 and a common line protruding portion 32 which extends from the common line 31 to have a width which is larger than the common line 31, and a dummy pattern portion 50 which partially overlaps the common line portion 30. In one exemplary embodiment, the dummy pattern portion 50 partially overlaps a boundary region between the common line 31 and the common line protruding portion 32 of the common line portion 30. However, present invention is not limited thereto, and the dummy pattern portion 50 may partially overlap various regions of the common line portion 30. Alternative exemplary embodiments include configurations wherein the dummy pattern portion 50 may partially overlap a region of the common line 31, and may partially overlap the common line protruding portion 32.

The peripheral region P of the current exemplary embodiment of a display device includes a common pad portion 20 which includes the common pad 21, and a connecting portion 40 which connects the common pad portion 20 and the common line portion 30. In the current exemplary embodiment the common pad 21 has the largest width of the common power supply unit 10, and the common line 31 has the smallest width of the common power supply unit 10. In addition, in one exemplary embodiment the widths of the common pad protruding portion 22 and a common line protruding portion 32 between the common pad 21 and the common line 31 are gradually reduced to the width of the common line 31.

The dummy pattern portion 50 includes a plurality of dummy overlapping lines 51 which partially overlap the common line portion 30, a plurality of dummy electrode plates 52 which are connected to the dummy overlapping lines 51, and a plurality of dummy connecting lines 53 which are connected to the dummy electrode plates 52. In the current exemplary embodiment, the three dummy overlapping lines 51 extend from one dummy electrode plate 52, and partially overlap the common line portion 30. Furthermore, the three dummy connecting lines 53 extend and connect the dummy electrode plate 52 and another dummy electrode plate 52 (not shown) adjacent to the dummy electrode plate 52.

In addition, a buffer layer 170 is provided between the common line portion 30 and the dummy pattern portion 50 in a region where the common line portion 30 and the dummy pattern portion 50 overlap each other. The buffer layer 170 prevents the upper metal layer, e.g., the common line portion 30, from being formed with gaps therein due to the vertical step created by the disposition of the lower metal layer, e.g., the dummy overlapping line 51. That is, when only the gate insulating film 111 is formed on the common line 31, if the dummy overlapping line 51 is formed on the common line 31, the dummy overlapping line 51 may be easily disconnected due to a vertical step crated by the disposition of the lower common line 31. In contrast, according to the current exemplary embodiment, the phenomenon can be prevented by forming a buffer layer 170 between the common line 31 and the dummy overlapping line 51.

The buffer layer 170 includes a gate insulating film 111 and an active layer 133 which, according to one exemplary embodiment, may be formed from the same layers as are used when forming the thin film transistor 150 of the display region D. In one exemplary embodiment the thickness of the active layer 133 used in the buffer layer 170 is smaller than that of the active layer 133 used for the thin film transistor 150 in the display region D.

In the current exemplary embodiment, the thickness of the buffer layer 170 is thin enough such that an insulating property of the buffer layer 170 may be easily collapsed, or shorted through, when static electricity is applied thereto. Once the static electricity shorts through the buffer layer 170, the common line portion 30 and the dummy pattern portion 50 are electrically connected to each other in an overlapping region therebetween, thereby forming a separate path through which static electricity may easily exit.

As shown in FIG. 6, the storage electrode line 130 of the display region D has a portion extending to the peripheral region P such that the storage electrode line 130 is disposed to be adjacent to the common line 31 of the common line portion 30. In this exemplary embodiment the storage electrode line 130 is formed using a metal film which forms the gate line 120, and the common line 31 is formed by using a metal film which forms the data line 150. Alternative exemplary embodiments include configurations wherein the storage electrode line 130 is formed using a metal film which forms the data line 150 and the common line 31 is formed by using a metal film which forms the gate line 120. In this exemplary embodiment, the storage electrode line 130 and the common line 31 are electrically connected to each other by a connecting pad 180 which is connected to the storage electrode line 130 and the common line 31 through the separate contact holes 182 and 181, respectively. As a result, the common power of the common line portion 30 may be supplied to the storage electrode line 130 through the connecting pad 180.

An exemplary embodiment of a method of manufacturing the second exemplary embodiment of a display device according to the present invention will be described with reference to FIGS. 7A-15.

FIGS. 7A, 8A, 9A, 10A and 11A are top plan views illustrating an exemplary embodiment of a method of manufacturing the second exemplary embodiment of a display device according to the present invention. FIGS. 7B, 8B, 9B, 10B and 11B are cross-sectional views taken along lines E-E and F-F of FIGS. 7A, 8A, 9A, 10A and 11A, respectively, illustrating an exemplary embodiment of a method of manufacturing the second exemplary embodiment of a display device according to the present invention. FIGS. 8C to 8F are cross-sectional views illustrating an exemplary embodiment of a method of manufacturing the active layer and the protective layer of the second exemplary embodiment of a display device according to the present invention.

Figure 7A:
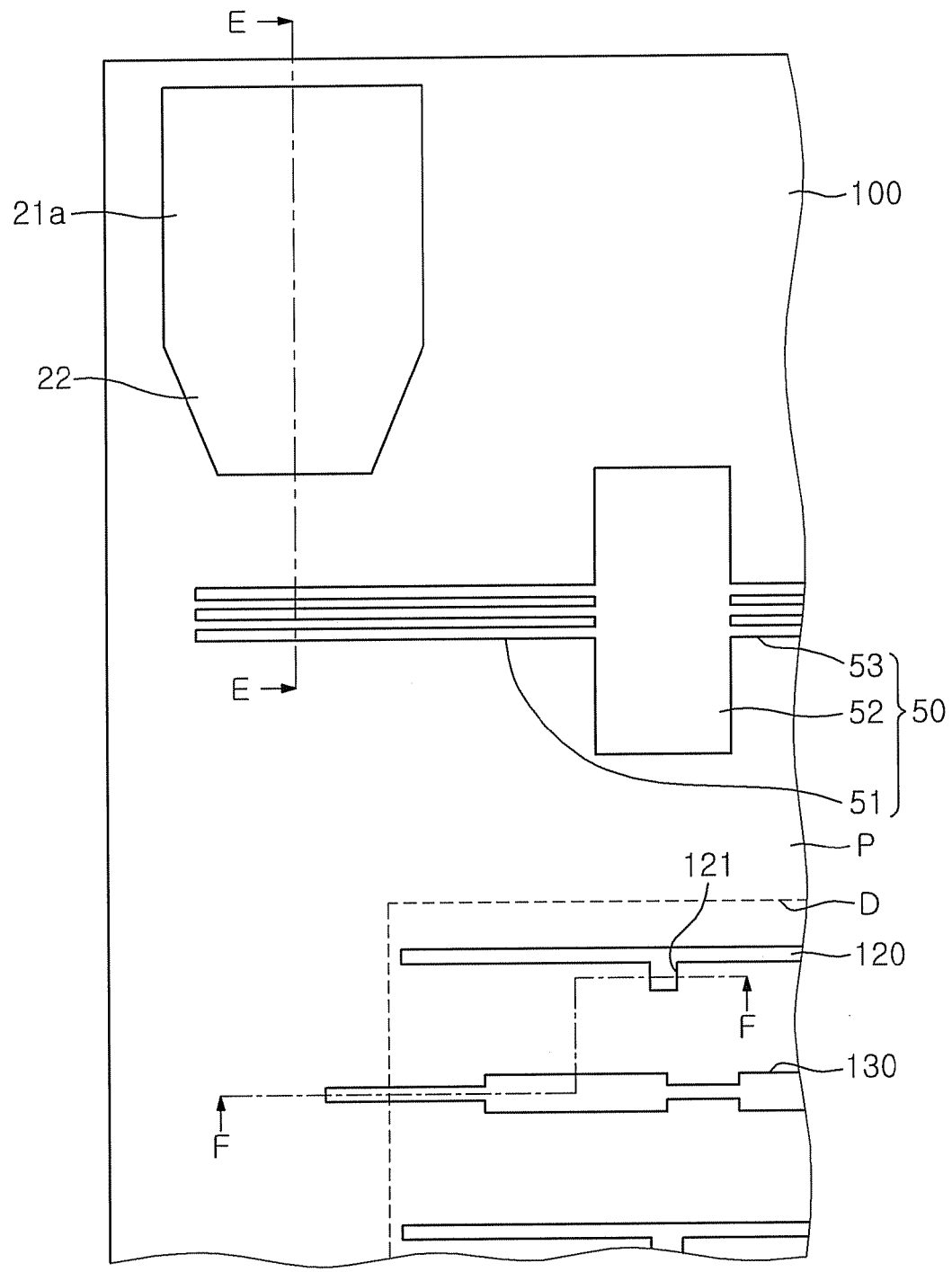
FIGS. 7A, 8A, 9A, 10A and 11A are top plan views illustrating an exemplary embodiment of a method of manufacturing the second exemplary embodiment of a display device according to the present invention.
Figure 7B:
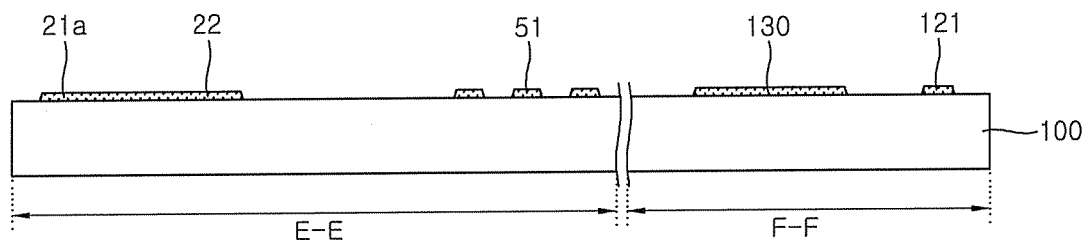
FIGS. 7B, 8B, 9B, 10B and 11B are cross-sectional views taken along lines E-E and F-F of FIGS. 7A, 8A, 9A, 10A and 11A, respectively, illustrating an exemplary embodiment of a method of manufacturing the second exemplary embodiment of a display device according to the present invention.

Referring to FIGS. 7A and 7B, a first conductive film is formed on a TFT substrate 100 which is defined by the display region D and the peripheral region P. In one exemplary embodiment the TFT substrate 100 is light transmitting and insulating. A patterning process is performed on the first conductive film, such that gate electrodes 121, gate lines 120, and storage electrode lines 130 are formed in the display region D, and a first pad layer 21a for a common pad, a common pad protruding portion 22 extending from the first pad layer 21a, and a dummy pattern portion 50 are formed in the peripheral region P. In the present exemplary embodiment, a portion of the storage electrode line 130 protrudes to the peripheral region P, and a gate pad (not shown) is provided at an end of the gate line 120. Alternative exemplary embodiments include configurations wherein the gate line 120 is connected directly to a source of gate signals. In addition, the dummy pattern portion 50 includes dummy overlapping lines 51, a plurality of dummy electrode plates 52 having at least one dummy electrode plate which is connected to the dummy overlapping lines 51, and dummy connecting lines 53 which connect the dummy electrode plates 52.

In the current exemplary embodiment the first conductive film is formed on the TFT substrate 100 by a deposition method, exemplary embodiments of which include a chemical vapor deposition ("CVD") method, a physical vapor deposition ("PVD") method, a plasma enhanced chemical vapor deposition ("PECVD") method, and a sputtering method. In one exemplary embodiment at least material one selected from the group consisting of Cr, "MoW", Cr/Al, Cu, Al (Nd), Mo/Al, Mo/Al (Nd), Cr/Al (Cd), and Mo/Al/Mo is used as the first conductive film. However, the invention is not limited thereto, and as described above, alternative exemplary embodiments use at least one metal selected from the group consisting of Al, Nd, Ag, Ti, Ta, Mo, Cr, "MoW", and Cu or an alloy thereof as the first conductive film. In addition, exemplary embodiments of the first conductive film may be formed of a single layer and alternative exemplary embodiments may have a multilayered structure. That is, the first conductive layer may be formed of a double layer or a triple layer which includes a metal layer, exemplary embodiments of which include Cr, Ti, Ta, Mo, and other similar materials, which has excellent physical and chemical characteristics, and a metal layer of the Al series or the Ag series.

According to the current exemplary embodiment, after the first conductive film is formed on the entire substrate 100, a photosensitive film is coated thereon, a lithography process using a mask is performed thereon, and a photosensitive film mask pattern is formed. All etching process is performed using the photosensitive film mask pattern as an etching mask. As shown in FIGS. 7A and 7B, the plurality of gate lines 120, the gate electrodes 121, and the storage electrode lines 130 are formed in the display region D, and a first pad layer 21a and a common pad protruding portion 22 for a common pad 21 and a dummy pattern portion 50 are formed in the peripheral region P. Then, the photosensitive film mask pattern is removed by performing a predetermined removing process.

Referring to FIG. 8, the gate insulating film 111, the active film 133, and the ohmic contact film 134 are sequentially formed on the entire structure shown in FIGS. 7A and 7B, and a patterning process is performed thereon. As a result, the active layers 133 and 134 for the thin film transistors 140 are formed in the display region D, and the buffer layer 170 is formed in the peripheral region P. In one exemplary embodiment the thickness of the buffer layer 170 may be smaller than the combined thicknesses of the active layers 133 and 134.

The above-described process will be described in more detail below with reference to FIGS. 8C-8F.

Figure 8A:
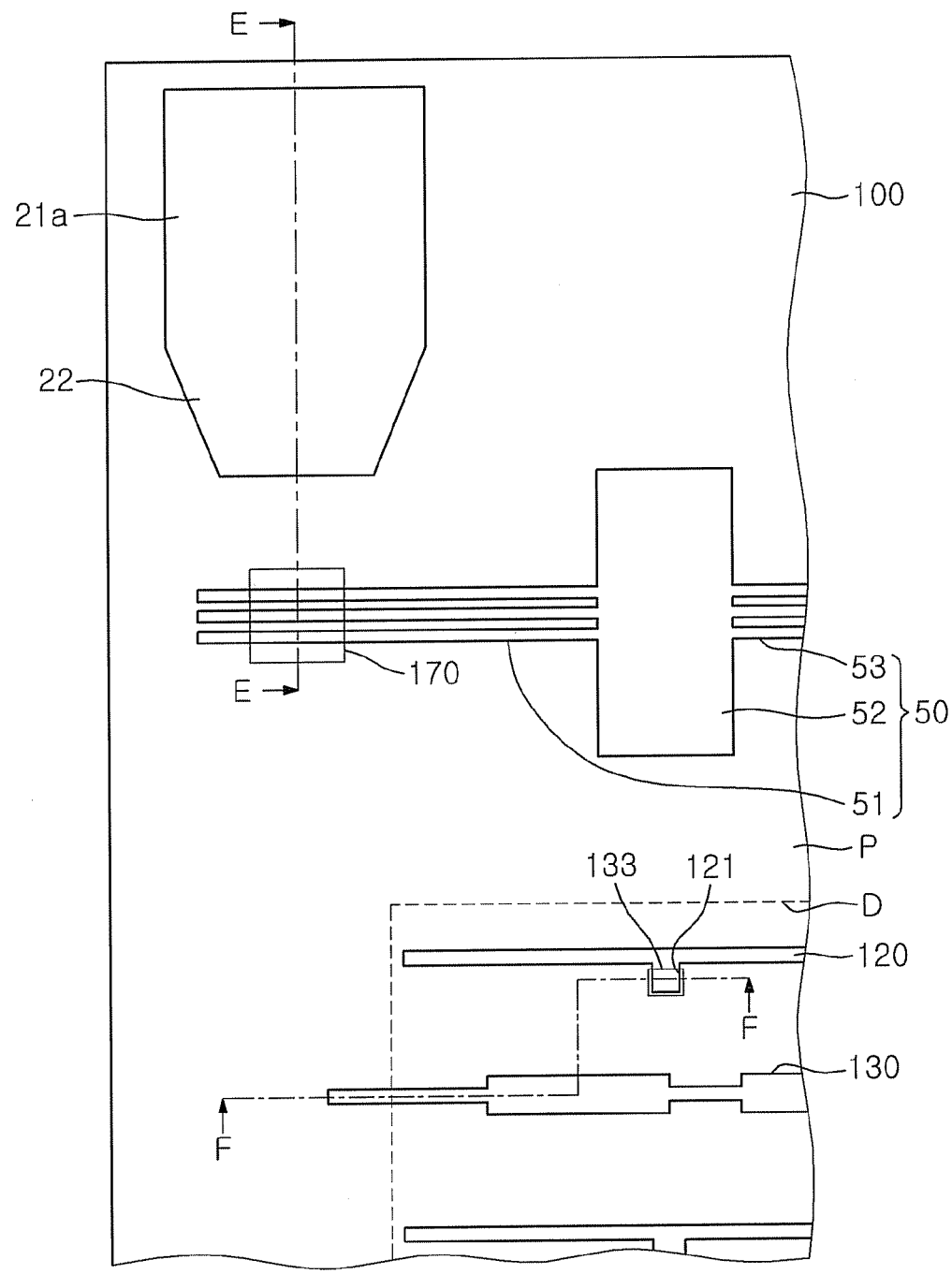
Figure 8B:
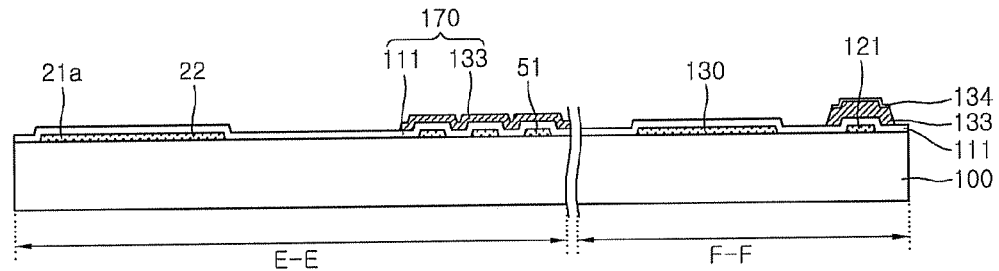
Figure 8C:
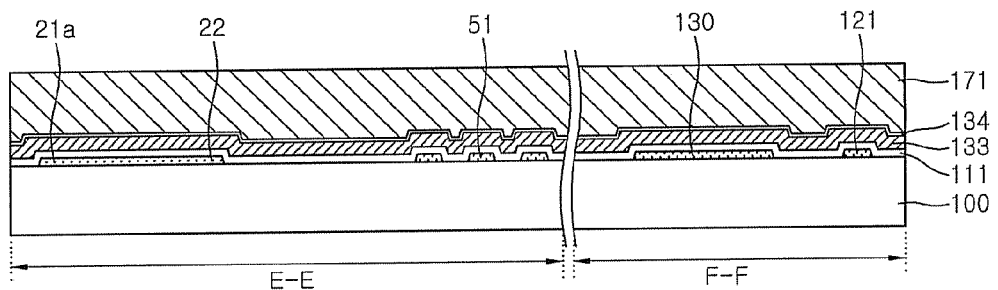
FIGS. 8C-8F are cross-sectional views illustrating an exemplary embodiment of a method of manufacturing an active layer and a protective layer according to the present invention.

As shown in FIG. 8C, first, the gate insulating film 111 is formed on the substrate 100 using a deposition method, exemplary embodiments of which have been described above. In one exemplary embodiment the gate insulating film 111 may be made of an inorganic insulating material which contains silicon oxide and/or silicon nitride. In addition, the active film 133 and the ohmic contact film 134 are sequentially formed on the gate insulating film 111. The photosensitive film 171 is coated on the ohmic contact film 134.

Figure 8D:
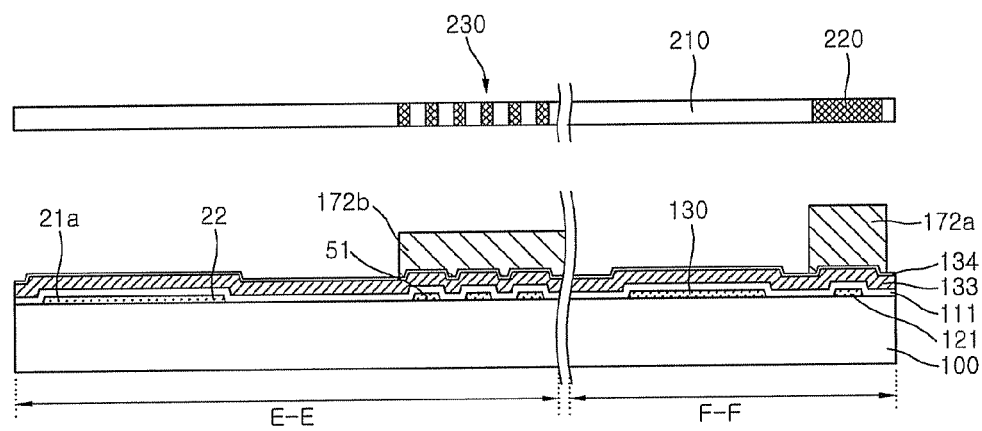

As shown in FIG. 8D, a slit mask including a light transmitting portion 210, a light shielding portion 220, and a slit portion 230 is aligned on the TFT substrate 100. The light shielding portion 220 corresponds to a region where the active layers 133 and 134 for the thin film transistors 140 are to be formed, and the slit portion 230 corresponds to a region where the buffer layer 170 of the substrate 100 is to be formed. Then, the photosensitive film 171 on the TFT substrate 100 is exposed using the slit mask, and development is performed, thereby forming the photosensitive film mask patterns 172a and 172b. A photosensitive film mask pattern 172a having a first thickness is provided on the region where the active layers 133 and 134 for the thin film transistors 140 are to be formed, and a photosensitive film mask pattern 172b which has a second thickness smaller than the first thickness is provided on the region where the buffer layer 170 is to be formed. Alternative exemplary embodiments include configurations wherein a transflective mask including a transflective portion is used instead of the slit mask.

Figure 8E:
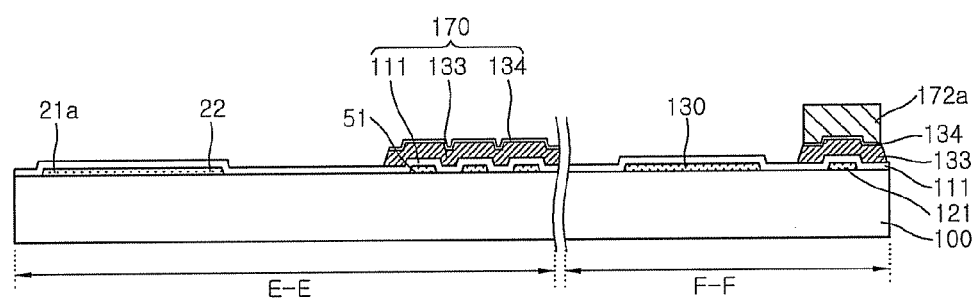

As shown in FIG. 8E, the etching process which uses the photosensitive film mask patterns 172a and 172b as etching masks is performed to remove the ohmic contact film 134 and the active film 133. As a result, the active layers 133 and 134 are formed in the display region D, and the buffer layer 170 is formed in the peripheral region P. Then, the buffer layer 170 in the peripheral region P is exposed by reducing the thickness of each of the photosensitive film mask patterns 172a and 172b. That is, as in the exemplary embodiment described above, the thickness of the photosensitive film mask pattern 172b which is provided on the active layers 133 and 134 in the display region D is larger than that of the photosensitive film mask pattern 172b which is provided on the buffer layer 170 in the peripheral region P. Accordingly, when the height of the photosensitive film mask patterns 172a and 172b is reduced as shown in FIG. 8D, a photosensitive film mask pattern 172c having a predetermined thickness remains on the active layers 133 and 134 in the display region D, as shown in FIG. 8E. However, the mask pattern on the buffer layer 170 in the peripheral region P is removed.

Figure 8F:
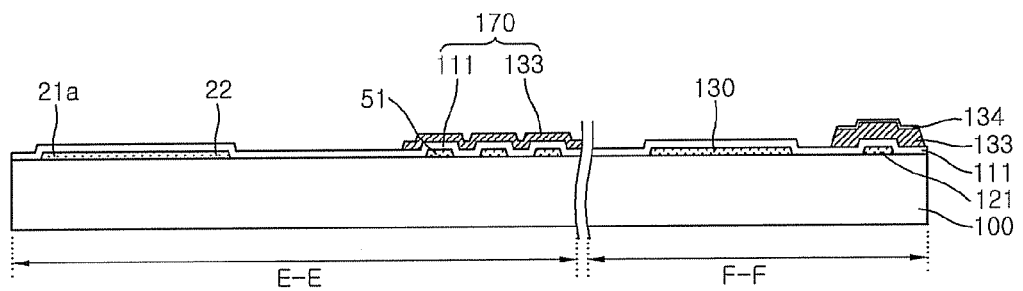

As shown in FIG. 8F, an etching process is performed using the photosensitive film mask pattern 172c as an etching mask whose thickness is reduced, and a portion of the buffer layer 170 in the peripheral region P is removed, thereby reducing the thickness of the buffer layer 170. That is, portions of the ohmic contact film 134 and the active film 133 are removed by etching the buffer layer 170. Then, the residual photosensitive film mask pattern 172c is removed.

According to the exemplary embodiment of a method of making the second exemplary embodiment of a display device, by performing the above-described processes, the gate insulating film 111, the active film 133, and the ohmic contact film 134 are formed on the TFT substrate 100, and the patterning process is performed thereon. As a result, the active layers 133 and 134 for the thin film transistors 140 are formed in the display region D, and the buffer layer 170 which has a smaller thickness than the active layers 133 and 134 is formed in the peripheral region P. The buffer layer 170 is formed in a region above the dummy overlapping line 51 of the dummy pattern portion 50 with respect to the TFT substrate 100. In one exemplary embodiment the buffer layer 170 is provided on a region of the dummy overlapping line 51 which overlaps the common line 31.

Figure 9A:
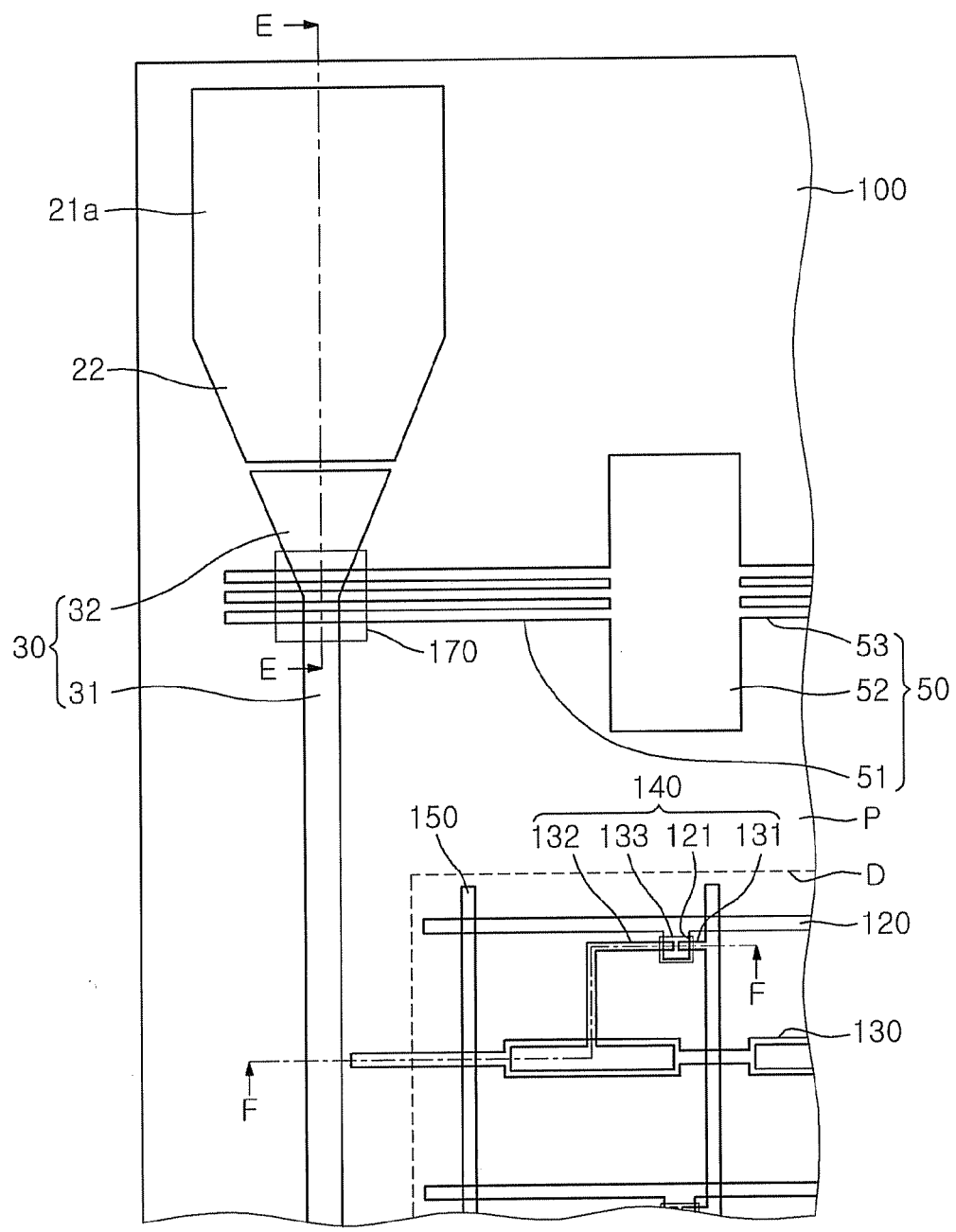
Figure 9B:
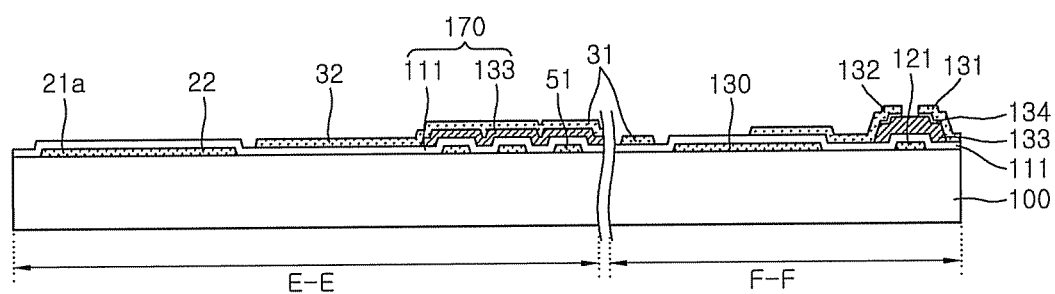

Referring to FIGS. 9A and 9B, a second conductive film is formed on the entire substrate 100, and a patterning process is performed thereon. As a result, the source electrodes 131, the drain electrodes 132, and the data lines 150 are formed in the display region D. In addition, the common line portion 30, which includes the common line 31 and the common line protruding portion 32, is formed in the peripheral region P. This process is explained in detail below.

That is, according to the current exemplary embodiment the second conductive film is formed on substantially the entire TFT substrate 100 using a deposition method, exemplary embodiments of which include a CVD method, a PVD method, and a sputtering method. Exemplary embodiments of the second conductive film may be formed of a single layer or a multilayered structure which is made of a metal selected from the group consisting of Mo, Al, Cr, and Ti or an alloy thereof. In one exemplary embodiment the second conductive film may be made of the same material as the first conductive film.

In the current exemplary embodiment a photosensitive film is coated on the second conductive film and then subjected to a lithography process, thereby forming a photosensitive film mask pattern. A portion of the second conductive film is removed by an etching process using the photosensitive film mask pattern as the etching mask. As a result, in the display region D, the source and drain electrodes 131 and 132 are formed, and the data lines 150 which are connected to the source electrodes 131 are formed. The common line 31 and the common line protruding portion 32 are formed in the peripheral region P. In the current exemplary embodiment the boundary region between the common line 31 and the common line protruding portion 32 is located on the buffer layer 170, and overlaps the dummy overlapping line 51 of the dummy pattern portion 50.

After the photosensitive film mask pattern is removed, the ohmic contact film 134 between the source and drain electrodes 131 and 132 is removed by an etching process using the etched second conductive film as the etching mask, which forms a channel including an active film 133 between the source electrode 131 and the drain electrode 132. As a result, the thin film transistor 140 is formed. The etching process may include; a wet etching process to remove the second conductive film in the region where the photosensitive film mask pattern is not formed, and a dry etching process to remove the ohmic contact film 134. An ashing process, one exemplary embodiment of which uses $O_2$ plasma, is performed between the wet etching process and the dry etching process so as to remove the photosensitive film mask pattern.

Figure 10A:
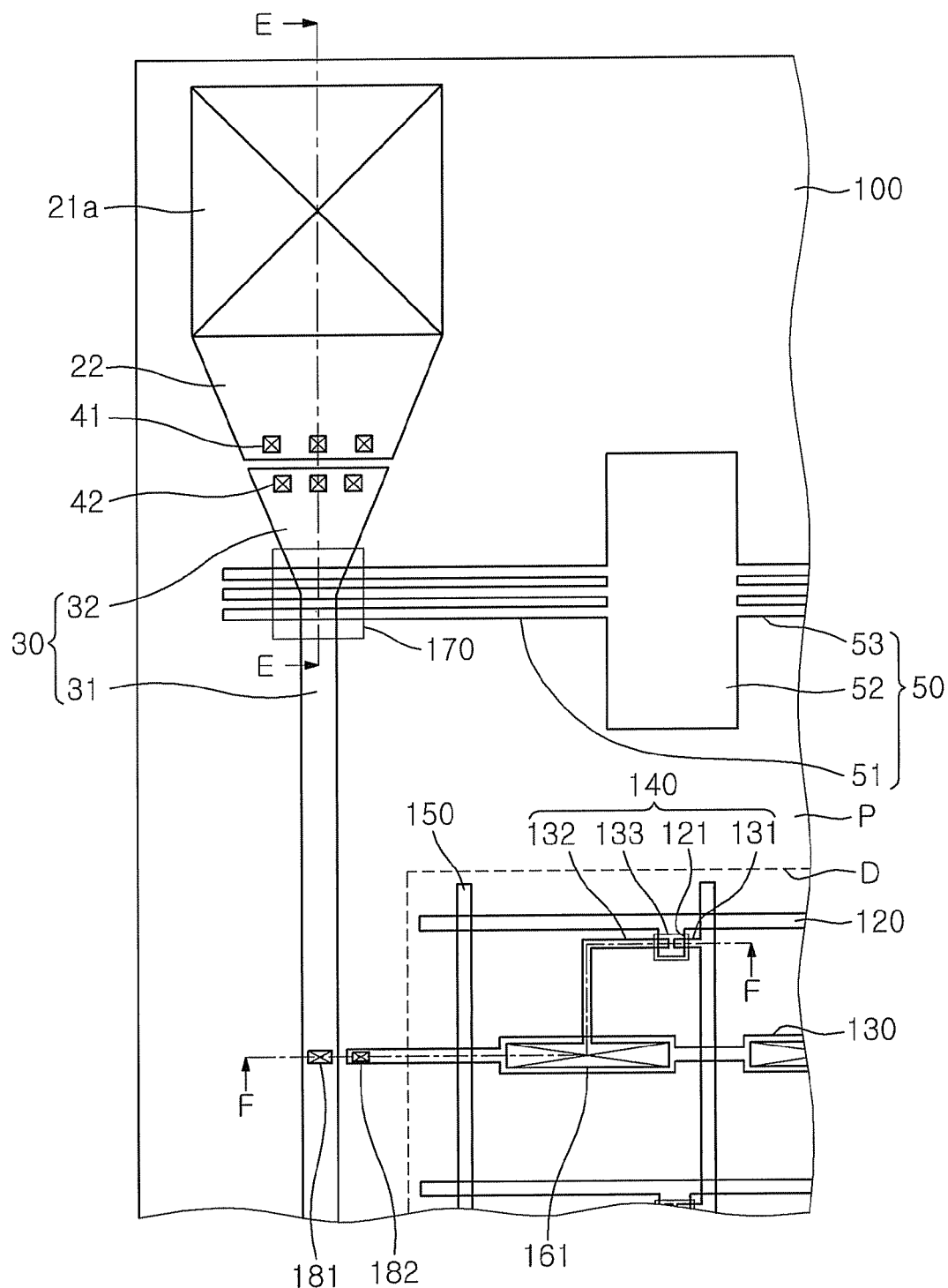
Figure 10B:
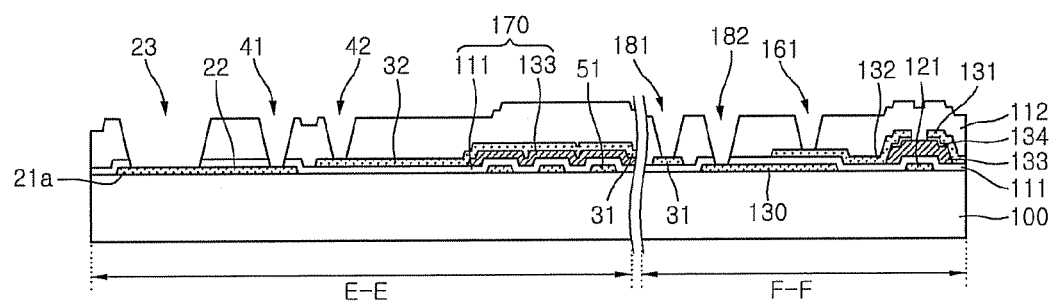

Referring to FIGS. 10A and 10B, a protective film 112 is formed on the substrate 100, and a patterning process is performed thereon, thereby forming a plurality of contact holes. A contact hole 161, through which a portion of the drain electrode 132 is exposed, is formed in the display region D. In addition, a pad contact hole 23, through which a portion of the first pad layer 21a of the common pad 21 is exposed, is formed in the peripheral region P. The first and second connecting contact holes 41 and 42, though which portions of the common pad protruding portion 22 and the common line protruding portion 32 are exposed, respectively, are formed, and the first and second connecting pad contact holes 181 and 182, through which portions of the common lines 31 and the storage electrode lines 130 are exposed, are formed. In one exemplary embodiment, an organic material or an inorganic material may be used to form the protective film 112. In the current embodiment a photosensitive organic material is used to form the protective film 112. Portions of the protective film 112 are removed by performing a photolithography process using a predetermined photosensitive film mask, thereby forming the above-described plurality of contact holes.

Figure 11A:
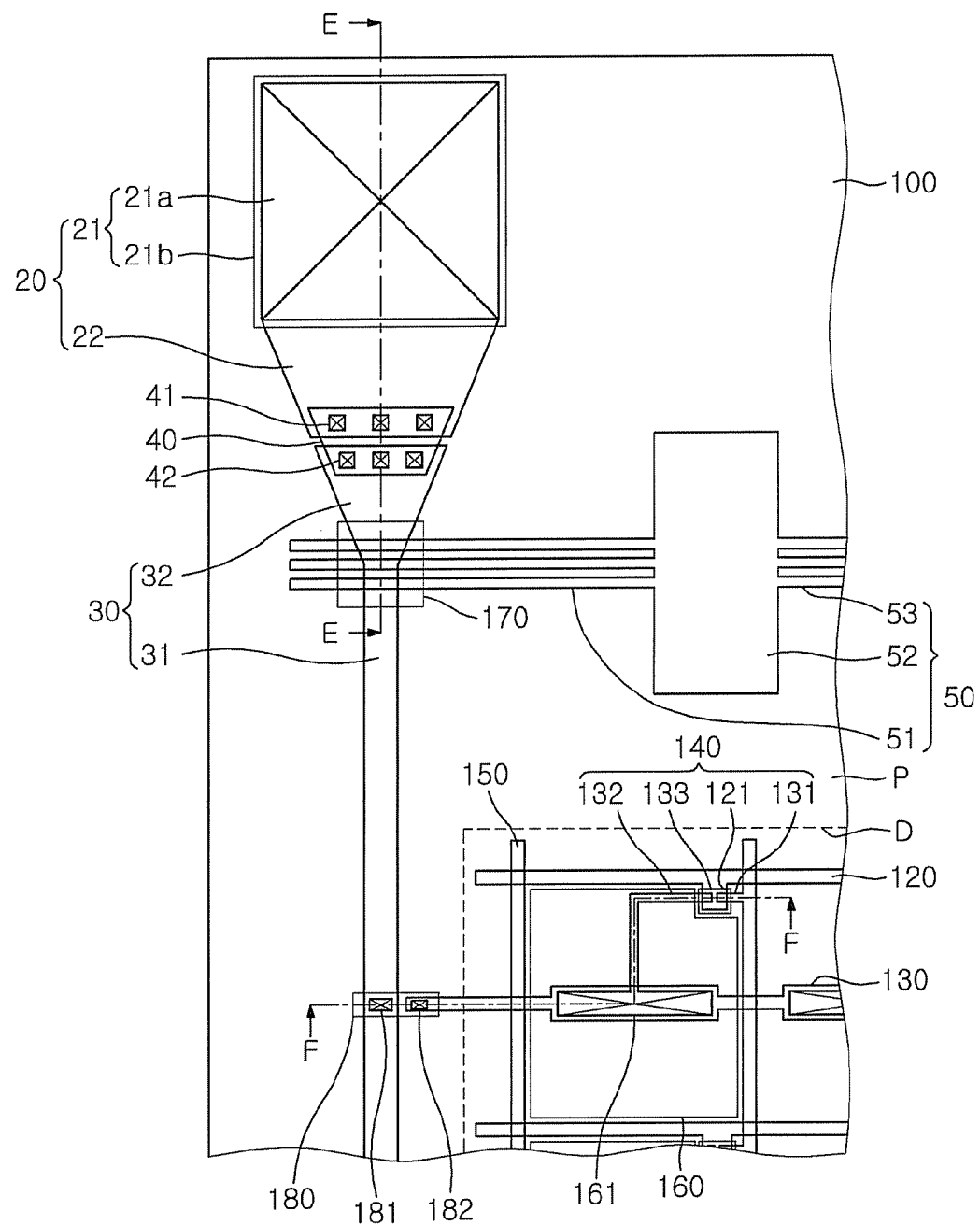
Figure 11B:
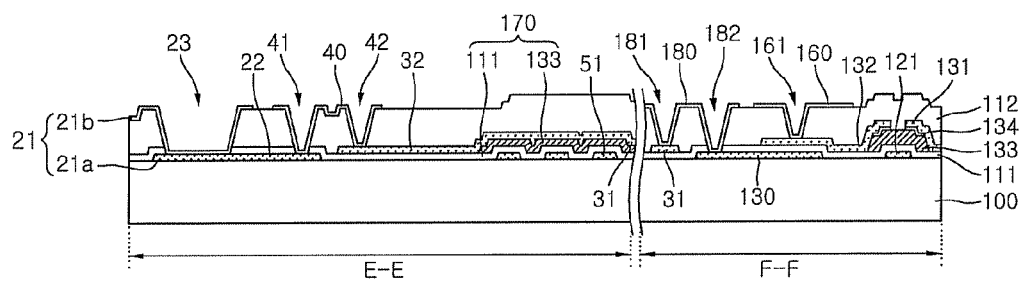

Referring to FIGS. 11A and 11B, after a third conductive film is formed on the protective film 112, a patterning process is performed thereon, which forms the pixel electrode which is connected to the drain electrode 132 through the drain contact hole 161 in the display region D. Then, the third conductive film is patterned, thereby forming the second pad layer 21b which is connected to the first pad layer 21a through the pad contact hole 23 in the peripheral region P, and also forming the connecting portion 40 which connects the common pad protruding portion 22 and the common line protruding portion 32 through the first and second contact holes 41 and 42, and also forming the connecting common pad portion 180 through the first and second connecting pad contact holes 181 and 182. In one exemplary embodiment the third conductive film uses a transparent conductive film which contains indium tin oxide ("ITO") or indium zinc oxide ("IZO").

As described above, in this exemplary embodiment, the dummy overlapping line 51 of the dummy pattern portion 50 overlaps the boundary region between the common line 31 and the common line protruding portion 32 of the common line portion 30. In addition, the buffer layer 170 is formed in a region where the dummy overlapping lines 51 and the common line portion 30 overlap each other. As described above, the buffer layer 170 is formed using the gate insulating film 111 and the active film 133 wherein the thickness of the buffer layer 170 is made smaller than that of the active layers 133 and 134 in the display region D using the slit mask. As a result, the insulating property of the buffer layer 170 between the dummy overlapping line 51 and the common line portion 30 may be easily collapsed, or shorted through, due to static electricity from the outside. As such, since the insulating layer of the buffer layer 170 may be easily collapsed, the static electricity from the outside may be dispersed through the dummy overlapping line 51 of the dummy pattern portion 50.

However, exemplary embodiments of the present invention are not limited thereto. That is, alternative exemplary embodiments include configurations wherein a plurality of capacitors are provided in the dummy pattern portion so as to stores the static electricity permeating from the outside, such that it is possible to effectively reduce or remove the static electricity. Hereinafter, a third exemplary embodiment of a display device according to the present invention will be described with reference to the accompanying drawings. Various aspects of the third exemplary embodiment may be applied to the first and second exemplary embodiments described above.

Figure 12:
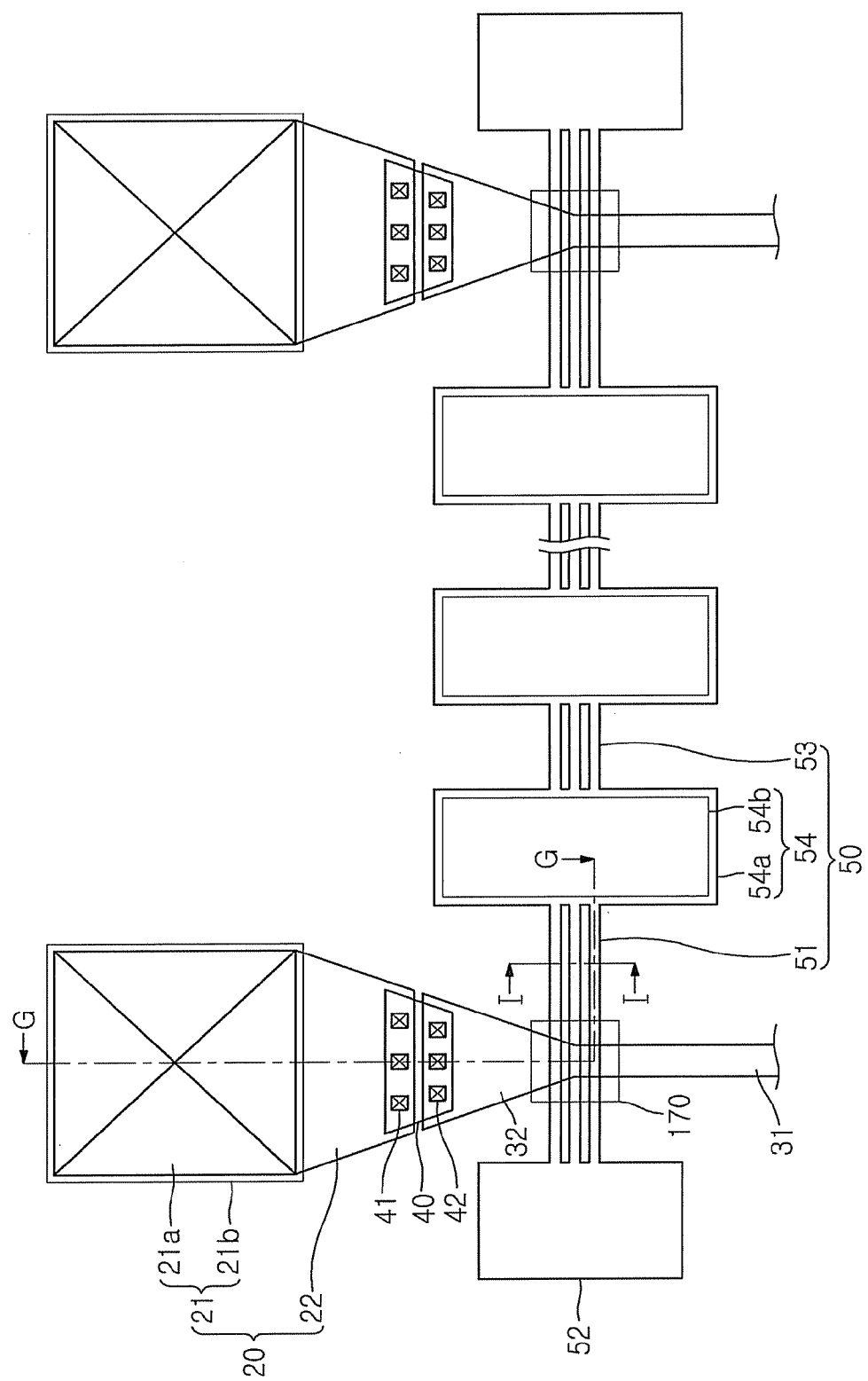
FIG. 12 is a top plan view illustrating a partial region of a third exemplary embodiment of a display device according to the present invention.
Figure 13:
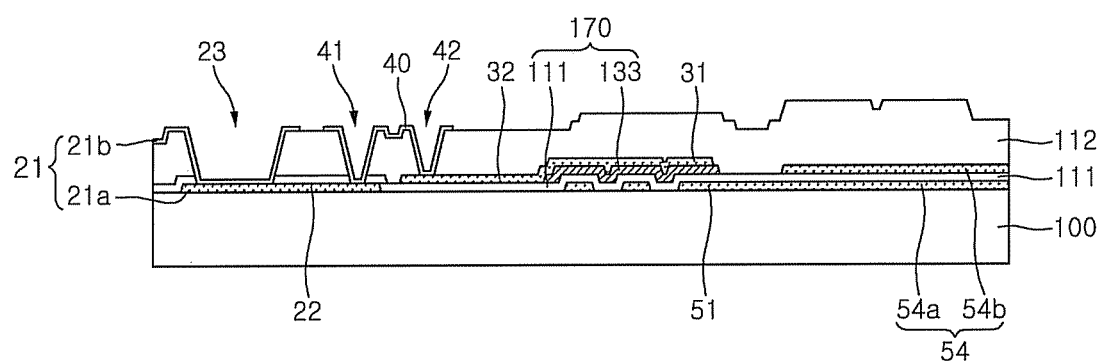
FIG. 13 is a cross-sectional view taken along line G-G of FIG. 12.

FIG. 12 is a top plan view illustrating a partial region of a third exemplary embodiment of a display device according to the present invention. FIG. 13 is a cross-sectional view taken along line G-G of FIG. 12.

The dummy pattern portion in the peripheral region of the display device will be described in more detail below.

Referring to FIGS. 12 and 13, in the peripheral region P of the third exemplary embodiment of a display device according to the present invention, a common line portion 30 and a dummy pattern portion 50 are provided. The common line portion 30 supplies common power, and the dummy pattern portion 50 includes at least one dummy capacitor 54. The dummy pattern portion 50 partially overlaps the common line portion 30 and stores charge.

The common line portion 30 includes a common line 31, and a common line protruding portion 32 which extends so as to have a larger width than the common line 31. In addition, the common pad portions 20 are disposed at both ends of the common line portion 30, and are electrically connected to the common line portion by the connecting portion 40. Exemplary embodiments include configurations wherein the above-described common line protruding portion 32 may not be formed in the common line portion 30. In addition, alternative exemplary embodiments include configurations wherein the common pad portion 20 may be formed to extend from the end of the common line portion 30 as one piece as shown in FIG. 5.

In the current exemplary embodiment, the common pad portions 20 are provided at both ends of the common line portion 30. As described above, the common pad portions 20 are provided at both edge regions of one side of the display device, respectively. The dummy pattern portion 50 is disposed in a region between the common pad portions 20 which are provided in both edge regions.

The dummy pattern portion 50 includes dummy overlapping lines 51 which partially overlap the boundary region between the common line 31 of the common line portion 30 and the common line protruding portion 32, a plurality of dummy capacitors 54 having at least one dummy capacitor which is connected to the dummy overlapping lines 51, and dummy connecting lines 53 which connect the plurality of capacitors 54. As shown in FIG. 12, a dummy electrode plate 52 which is connected to the dummy overlapping line 51 may be provided at an end of the dummy overlapping lines 51, however, alternative exemplary embodiments include configurations wherein the dummy electrode plate 52 is omitted.

The dummy capacitor 54 includes a lower dummy electrode plate 54a, and an upper dummy electrode plate 54b which partially overlaps the lower dummy electrode plate 54a, and a gate insulating film 111 which is provided between the lower and upper dummy electrode plates 54a and 54b and functions as a dielectric. In one exemplary embodiment the lower dummy electrode plate 54a is connected to the dummy overlapping line 51 or the dummy connecting line 53. In such an exemplary embodiment the lower dummy electrode plates 54a of the neighboring dummy capacitors 54 are connected to one another by the dummy connecting lines 53. Further, the upper dummy electrode plate 54b is disposed in a floating state.

As such, in this exemplary embodiment, the plurality of dummy capacitors 54 are formed in the dummy pattern portion 50 so as to store the static electricity. This configuration allows for the removal of the static electricity.

That is, as described above, the external static electricity which has permeated through the common pad portion 20 supplied with the common power is guided to the common line portion 30. The static electricity which has permeated into the common line portion 30 causes an insulating layer to be collapsed, or shorted through, in an overlapping region between the common line portion 30 and the dummy pattern portion 50. Therefore, a separate path is provided which discharges the static electricity. That is, the common line portion 30 and the dummy pattern portion 50 are electrically connected to each other. Accordingly, the static electricity which has permeated into the common line portion 30 flows through the dummy pattern portion 50 by this path.

At this time, while the static electricity initially flows through the dummy overlapping line 51, a portion of static electricity is charged by the dummy capacitor 54 which is connected to the dummy overlapping line 51, and is then supplied to the neighboring dummy capacitor 54 through the dummy connecting line 53 which is connected to the dummy capacitor 54. That is, if the static electricity which flows through the dummy overlapping line 51 is supplied to the lower dummy electrode plate 54a which is connected to the dummy overlapping line 51, a charge which has a polarity opposite to that of the static electricity is guided to the upper dummy electrode plate 54b which floats on the lower dummy electrode plate 54a. This charging of the upper dummy electrode plate 54b charges the static electricity which corresponds to capacitance of the dummy capacitor 54 including the lower dummy electrode plate 54a and the upper dummy electrode plate 54b. After charging of the dummy capacitor 54 which is connected to the dummy overlapping line 51 is completed, the static electricity is supplied to another dummy capacitor 54 which is adjacent to the dummy capacitor 54 through the dummy connecting line 53. In addition, another capacitor 54 also charges the static electricity by the corresponding capacitance. Then, the static electricity is supplied to still another capacitor 54 which is adjacent to another capacitor 54 through the dummy connecting line. As such, static electricity is continuously charged by the plurality of dummy capacitors 54, thereby removing the static electricity. Although the current exemplary embodiment has been described with reference to four dummy capacitors 54, alternative exemplary embodiments include configurations wherein a greater or lesser number of dummy capacitors 54 are included, e.g., the capacitance of each of the dummy capacitors 54 which are provided at both ends of the common pad portion 20, and the number of dummy capacitors 54 are not limited, and they may be changed according to the strength of the static electricity which occurs during a process of manufacturing the display device.

The discharge plates are provided at one side of the dummy capacitor, and the gate insulating film 111 is provided between the discharge plates, which consumes the energy of static electricity. A fourth exemplary embodiment of a display device according to the present invention will be described below with reference to the accompanying drawings. The description which duplicates the above description will be omitted. Aspects of the fourth exemplary embodiment to be described below may be applied to the first to third exemplary embodiments.

Figure 14:
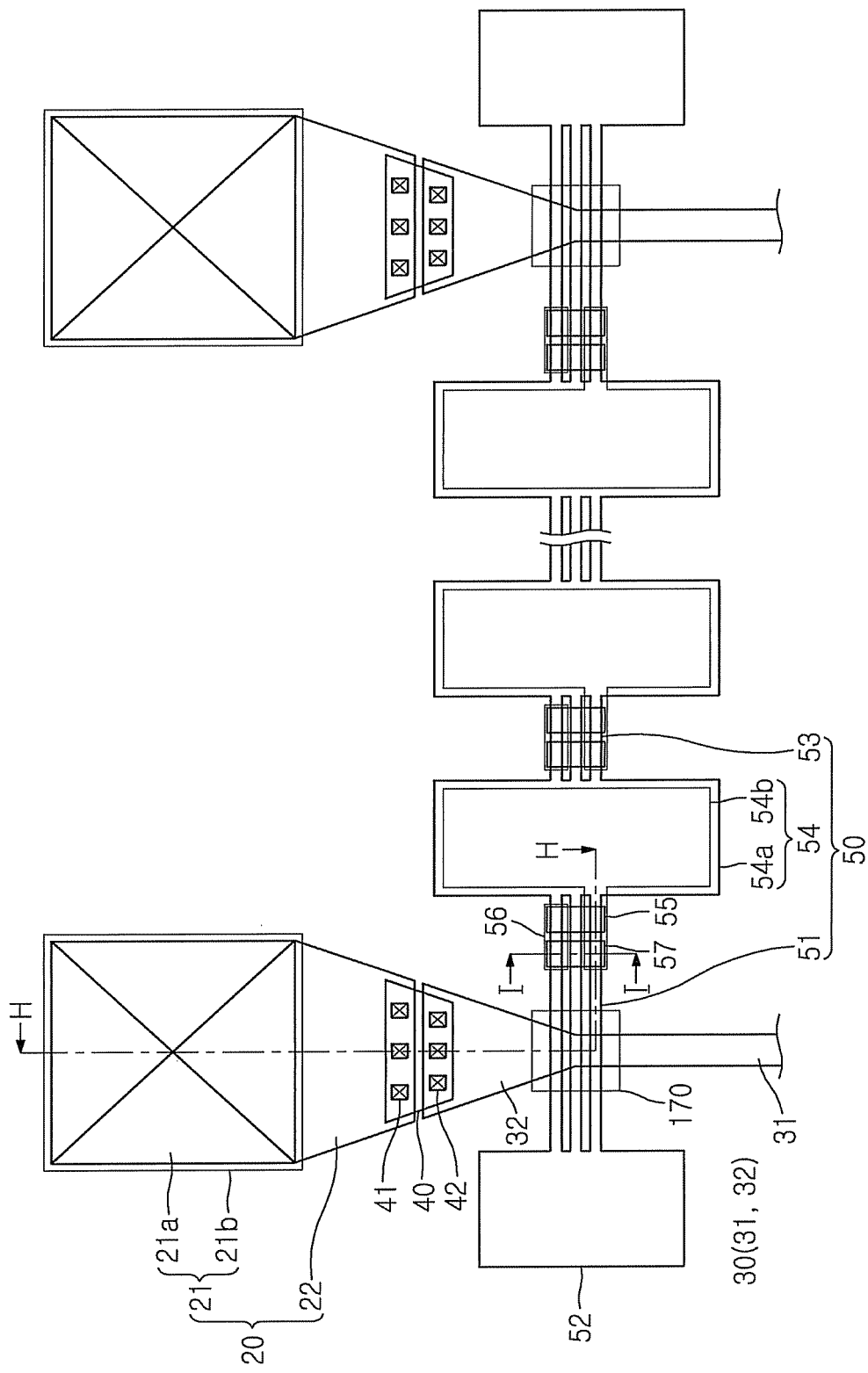
FIG. 14 is a top plan view illustrating a partial region of a fourth exemplary embodiment of a display device according to the present invention.
Figure 15:
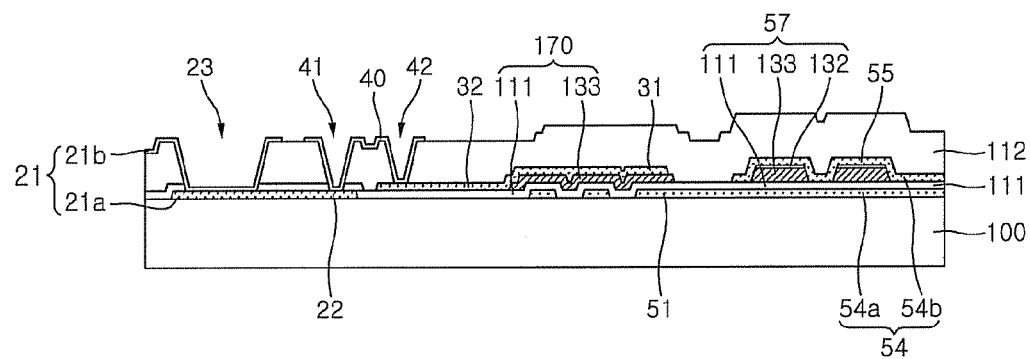
FIG. 15 is a cross-sectional view taken along line H-H of FIG. 14.
Figure 16:
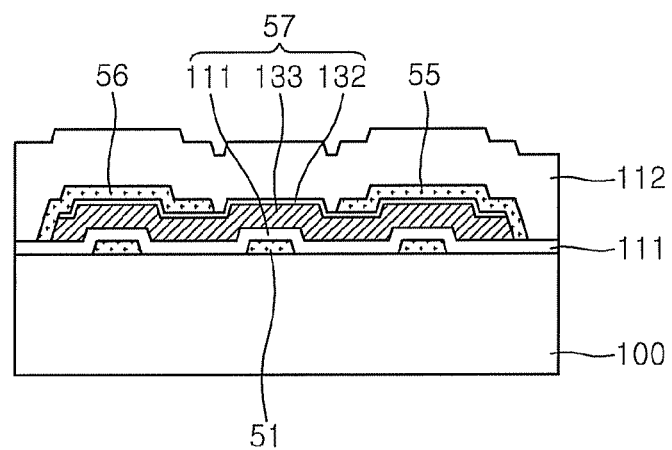
FIG. 16 is a cross-sectional view taken along line I-I of FIG. 14.

FIG. 14 is a top plan view illustrating a partial region of a fourth exemplary embodiment of a display device according to the present invention. FIG. 15 is a cross-sectional view taken along line H-H of FIG. 14. FIG. 16 is a cross-sectional view taken along line I-I of FIG. 14.

The dummy pattern portion in the peripheral region of the display device will be mainly described below.

Referring to FIGS. 14 to 16, in the peripheral region P of the fourth exemplary embodiment of a display device according to the present invention, a common line portion 30, and a dummy pattern portion 50 are provided. The common line portion 30 supplies the common power, and the dummy pattern portion 50 includes a pattern which partially overlaps the common line portion 30, and disperses the static electricity.

The dummy pattern portion 50 includes dummy overlapping lines 51 which partially overlap the common line portion 30, a plurality of dummy capacitors 54 having at least one dummy capacitor which is connected to the dummy overlapping lines 51, and dummy connecting wiring lines 53 which connect the dummy connecting lines 54. The dummy capacitor 54 includes a lower dummy electrode plate 54a which is connected to the dummy overlapping line 51 or the dummy connecting line 53, and an upper dummy electrode plate 54b which is spaced apart from the lower dummy electrode plate 54a.

In addition, the dummy pattern portion 50 according to the fourth exemplary embodiment further includes a dummy discharge plate 56 which is spaced apart from the upper dummy electrode plate 54b, and a dummy active layer 57 which is provided in a region below the upper dummy electrode plate 54b and the dummy discharge plate 56. The upper dummy electrode plate 54b includes an electrode plate protruding portion 55, the electrode plate protruding portion 55 is spaced apart from the dummy discharge plate 56 by a gap, and the dummy active layer 57 is provided in a region below the electrode plate protruding portion 55 and the dummy discharge plate 56. In one exemplary embodiment the electrode plate protruding portion 55 and the dummy discharge plate 56 are provided on the same plane. In addition, the electrode plate protruding portion 55 and the dummy discharge plate 56 are effectively formed by the same material film as the data line 150 in the display region D. As shown in FIG. 14, the electrode plate protruding portion 55 and the dummy discharge plate 56 are formed in a bar shape which extends in a substantially horizontal direction, and the dummy active layer 57 is formed in a bar shape which extends in a substantially vertical direction crossing the electrode plate protruding portion 55 and the dummy discharge plate 56. However, the invention is not limited thereto, and the dummy active layer 57 may be formed in a variety of shapes. In one exemplary embodiment, the dummy active layer 57 extends to the lower region of the dummy discharge plate 56 from the lower side of the electrode plate protruding portion 55. In one exemplary embodiment the dummy active layer 57 is formed by the same layer as the active layers 133 and 134 which are formed in the display region D. That is, the dummy active layer 57 includes a gate insulating film 111, an active film 133, and an ohmic contact film 134.

The permeation of the static electricity from the outside is as follows.

A short circuit in an insulating layer between the common line portion 30 and the dummy overlapping line 51 of the dummy pattern portion 50 occurs due to the static electricity, thereby forming a separate path through which the static electricity flows. That is, the static electricity which has permeated into the common wiring portion 30 flows through the dummy pattern portion 50 through the region whose insulating property is collapsed or shorted through. As described above, the static electricity which is supplied to the dummy pattern portion 50 is charged by capacitance of the dummy capacitor 54 of the dummy pattern portion 50. At this time, a potential difference is generated between the upper dummy electrode plate 54b and the dummy discharge plate 56 due to the fast influx of the static electricity. When the electrode plate protruding portion 55 is provided in the upper dummy electrode plate 54b, the potential difference is generated between the electrode plate protruding portion 55 and the dummy discharge plate 56. In the exemplary embodiment wherein the dummy active layer 157 includes an ohmic contact film 134, it is collapsed, or short circuited, due to the potential difference. At this time, due to the destruction of the ohmic contact film 134, a large portion of the energy of the static electricity is consumed. As a result, it is possible to reduce the strength of the static electricity.

As described above, according to the display device according to the exemplary embodiments of the invention, the separate dummy pattern is formed which partially overlaps the line supplied with the common power, and an insulating portion may be easily collapsed, or short circuited, in the overlapping region of the line and a separate dummy pattern due to the static electricity, thereby forming a separate path through which static electricity may exit. As a result, it is possible to disperse static electricity which has permeated through the line supplied with the common power.

According to the display device according to the exemplary embodiments of the invention, the dummy pattern partially overlaps the boundary region between the pad supplied with the common power and the line, that is, a region having high resistance, such that an insulating property between the line supplied with the common power and the dummy pattern may be easily collapsed.

According to the display device according to the exemplary embodiments of the invention, the thickness of the insulating film is reduced in the overlapping region between the line supplied with the common power and the dummy pattern, such that the insulating layer between the line and the dummy pattern may be easily collapsed.

According to the display device according to the exemplary embodiments of the invention, since the dummy electrode plate is provided in the dummy pattern, it is possible to disperse the static electricity which has permeated into the dummy pattern.

According to the display device according to the exemplary embodiments of the invention, since the dummy electrode plate is provided in the dummy pattern, the dummy capacitor is provided in the dummy pattern such that the static electricity corresponding to the capacitance of the capacitor is charged, which removes the static electricity.

According to the display device according to the exemplary embodiments of the invention, it is possible to consume energy of the static electricity through dielectric breakdown caused by the potential difference.

Although the invention has been described with reference to the accompanying drawings and the preferred exemplary embodiments, the invention is not limited thereto, but is defined by the appended claims. Therefore, it should be noted that various changes and modifications can be made by those skilled in the art without departing from the technical spirit of the appended claims.

What is claimed is:

1. A display device comprising:
a substrate including a display region and a peripheral region;
a common line portion provided in the peripheral region of the substrate, wherein the common line portion includes a common line and a common line protruding portion which extends away from and is wider than the common line;
a common pad portion spaced apart from the common line portion;
a connecting portion electrically connecting the common line portion to the common pad portion; and
a dummy pattern portion which partially overlaps a boundary region between the common line and the common line protruding portion,
wherein the connecting portion is electrically connected to the common pad portion and the common line portion by a first connecting contact hole and a second connecting contact hole, respectively.

2. The display device of claim 1,
wherein the common pad portion extends from the common line protruding portion.

3. The display device of claim 2,
wherein the common pad portion includes common pad portions provided at both edges of one side of the substrate, and
the dummy pattern portion is provided in a region between the common pad portions.

4. The display device of claim 1,
wherein the dummy pattern portion comprises:
a dummy overlapping line which overlaps a boundary region between the common line and the common line protruding portion;
at least one dummy electrode plate, wherein the at least one dummy electrode plate is connected to the dummy overlapping line; and
dummy connecting lines which connect dummy electrode plates.

5. The display device of claim 4, further comprising:
an upper dummy electrode plate provided on the at least one dummy electrode plate.

6. The display device of claim 5, further comprising:
a dummy discharge plate spaced apart from the upper dummy electrode plate and is disposed on substantially the same plane as the upper dummy electrode plate; and
a dummy active layer disposed in a region below the upper dummy electrode plate and the dummy discharge plate.

7. The display device of claim 1,
further comprising gate lines, data lines, thin film transistors, pixel capacitors and storage capacitors are provided in the display region of the substrate, and wherein
the common line portion is disposed on substantially the same layer as the data lines, and the dummy pattern portion is disposed on substantially the same layer as the gate lines.

8. The display device of claim 7,
wherein the thin film transistor includes an active layer, and a buffer layer, which has a smaller height than the active layer, is disposed on substantially the same layer as the active layer in an overlapping region between the common line portion and the dummy pattern portion.

9. The display device of claim 7,
wherein one terminal of each of the storage capacitors is disposed on substantially the same layer as the gate lines, and
said one terminal of each of the storage capacitors is connected to the common line of the common line portion through a connecting pad.

10. A display device comprising:
a substrate including a display region and a peripheral region;
a common line portion provided in the peripheral region of the substrate;
a common pad portion spaced apart from the common line portion,
a connecting portion electrically connecting the common line portion to the common pad portion;
dummy overlapping lines which overlap the common line portion;
a plurality of dummy electrode plates, wherein at least one dummy electrode plate of the plurality of dummy electrode plates is connected to at least one dummy overlapping line; and
wherein the connecting portion is electrically connected to the common pad portion and the common line portion by a first connecting contact hole and a second connecting contact hole, respectively.

11. The display device of claim 10, further comprising:
an upper dummy electrode plate provided on at least one of the dummy electrode plates.

12. The display device of claim 11, further comprising:
a dummy discharge plate spaced apart from the upper dummy electrode plate and disposed on substantially the same plane as the upper dummy electrode plate; and
a dummy active layer provided in a region below the upper dummy electrode plate and the dummy discharge plate.

13. The display device of claim 12,
wherein the upper dummy electrode plate further comprises an electrode plate protruding portion which is separated from the dummy discharge plate.

14. The display device of claim 10, further comprising:
thin film transistors each including an active layer are provided in the display region of the substrate, and
a buffer layer disposed on substantially the same layer as the active layer, wherein the buffer layer has a smaller height than the active layer, and the buffer layer is provided in a region between the common line portion and the dummy pattern portion.

15. The display device of claim 10,
wherein the common line portion comprises a common line, and a common line protruding portion which extends away from and has a larger width than the common line, and
the dummy overlapping line overlaps the common line portion in a boundary region between the common line and the common line protruding portion.

16. A display device comprising:
a substrate including a display region and a peripheral region, wherein the display region has an active layer disposed on the display region;
a common line portion provided in the peripheral region of the substrate;
a dummy pattern portion which overlaps the common line portion; and a buffer layer provided in an overlapping region between the common line portion and the dummy pattern portion,
wherein the buffer layer is formed on substantially the same layer as the active layer, and has a smaller height than the active layer.

17. The display device of claim 16,
wherein the common line portion comprises a common line, and a common line protruding portion which extends away from and has a larger width than the common line, and
the dummy pattern portion comprises:
a dummy overlapping line which overlaps a boundary region between the common line and the common line protruding portion;
at least one dummy electrode plate, wherein the at least one dummy electrode plate is connected to the dummy overlapping line; and
dummy connecting lines which connect dummy electrode plates.

18. The display device of claim 17, further comprising:
an upper dummy electrode plate which is provided on at least one of the dummy electrode plates;
a dummy discharge plate spaced apart from the upper dummy electrode plate and is disposed on substantially the same plane as the upper dummy electrode; and
a dummy active layer provided in a region below the upper dummy electrode plate and the dummy discharge plate.

19. A method of manufacturing a display device, the method comprising:
forming gate electrodes and gate lines in a display region of a substrate and forming a dummy pattern portion in a peripheral region of the substrate;
forming a gate insulating film on the substrate having the gate electrode, the gate lines and the dummy pattern portion;
forming an active layer on the gate insulating film;
forming a buffer layer having a smaller height than the active layer on at least a portion of the dummy pattern portion; and
forming data lines, source electrodes, and drain electrodes in the display region, and forming a common line portion supplied with common power in the peripheral region, wherein a portion of the common line portion is disposed on the buffer layer.

20. The method of claim 19,
wherein forming the buffer layer comprises:
forming a thin film for the buffer layer on the gate insulating film;
coating a photosensitive film on the thin film;
forming a photosensitive film mask pattern by a photolithography process using a mask including a slit and a partially transparent portion, wherein the thickness of the photosensitive film on a region of the active layer thin film where the buffer layer is to be formed is smaller than a thickness of the photosensitive film on a region of the active layer thin film where the active layer is to be formed;
etching the thin film using the photosensitive film mask pattern to form the active layer in the display region and to form the buffer layer in the peripheral region;
removing a portion of the photosensitive film mask pattern to expose the buffer layer;
removing a portion of an upper region of the buffer layer to reduce the thickness of the buffer layer; and
removing the residual photosensitive film.

* * * * *